(12) United States Patent
Shibata

(10) Patent No.: US 12,050,827 B2
(45) Date of Patent: Jul. 30, 2024

(54) PRINTING SYSTEM, PRINTING METHOD, AND STORAGE MEDIUM FOR IDENTIFYING PRINT DATA CANDIDATES

(71) Applicant: CANON KABUSHIKI KAISHA, Tokyo (JP)

(72) Inventor: Daisuke Shibata, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/166,694

(22) Filed: Feb. 9, 2023

(65) Prior Publication Data

US 2023/0315366 A1  Oct. 5, 2023

(30) Foreign Application Priority Data

Feb. 25, 2022 (JP) .................................. 2022-027678

(51) Int. Cl.
*G06F 3/12* (2006.01)
(52) U.S. Cl.
CPC ............ *G06F 3/126* (2013.01); *G06F 3/1256* (2013.01)
(58) Field of Classification Search
CPC ................................ G06F 3/126; G06F 3/1256
USPC ......................................................... 358/1.15
See application file for complete search history.

(56) References Cited

U.S. PATENT DOCUMENTS

| 7,038,796 B1 * | 5/2006 | Gupta | G06F 3/1272 358/1.9 |
|---|---|---|---|
| 2006/0087680 A1 * | 4/2006 | Maeda | G06F 3/1285 358/1.15 |
| 2007/0035766 A1 * | 2/2007 | Yamamura | H04L 67/02 358/1.15 |
| 2011/0149332 A1 * | 6/2011 | Cho | G06F 21/608 358/1.14 |
| 2011/0235114 A1 * | 9/2011 | Saitoh | G06F 3/1261 358/1.15 |
| 2019/0317705 A1 * | 10/2019 | Nakatani | G06F 3/1207 |
| 2020/0293254 A1 * | 9/2020 | Kanzaki | G06F 3/126 |
| 2022/0019393 A1 * | 1/2022 | Hamada | G06F 3/1273 |
| 2022/0035580 A1 * | 2/2022 | Awatsu | G06F 3/1292 |

FOREIGN PATENT DOCUMENTS

JP          2014232342 A          12/2014

* cited by examiner

*Primary Examiner* — Allen H Nguyen
(74) *Attorney, Agent, or Firm* — Canon U.S.A., Inc. IP Division

(57) ABSTRACT

A printing system includes a printing apparatus and a server, wherein the printing apparatus is configured to print, based on print data, an image on a sheet and wherein the server is configured to identify print data candidates and notify a user of the identified print data candidates at a timing based on a time set by a schedule management function, wherein printing apparatus prints the image on the sheet is based on print data selected by the user from among the notified print data candidates.

12 Claims, 21 Drawing Sheets

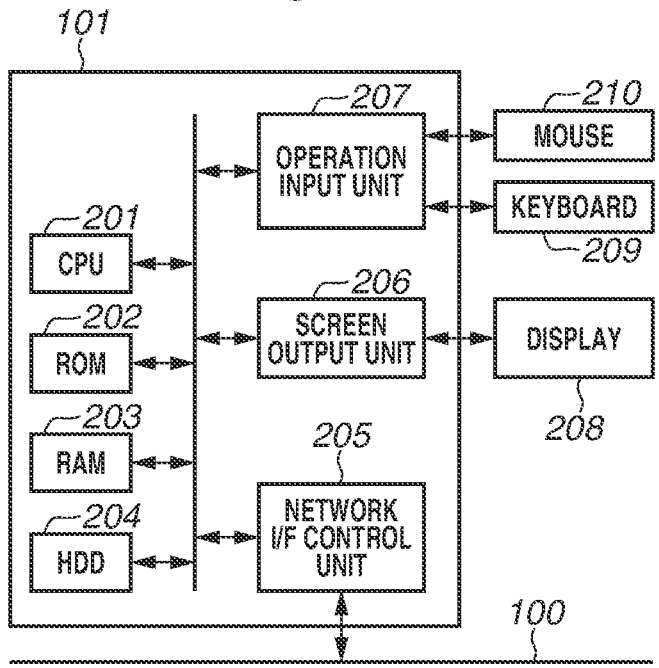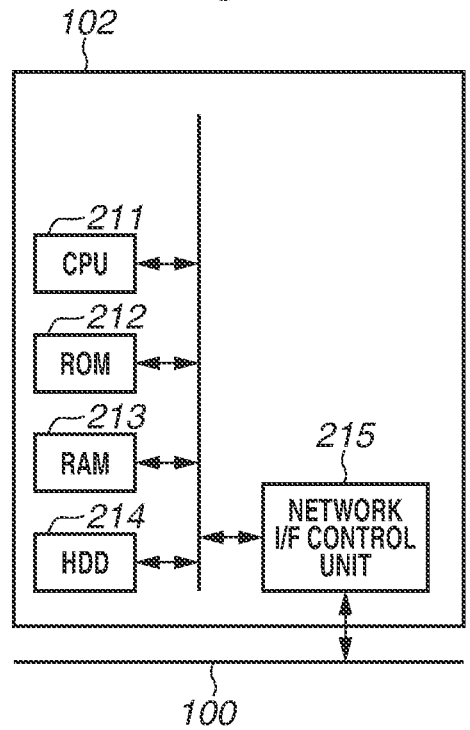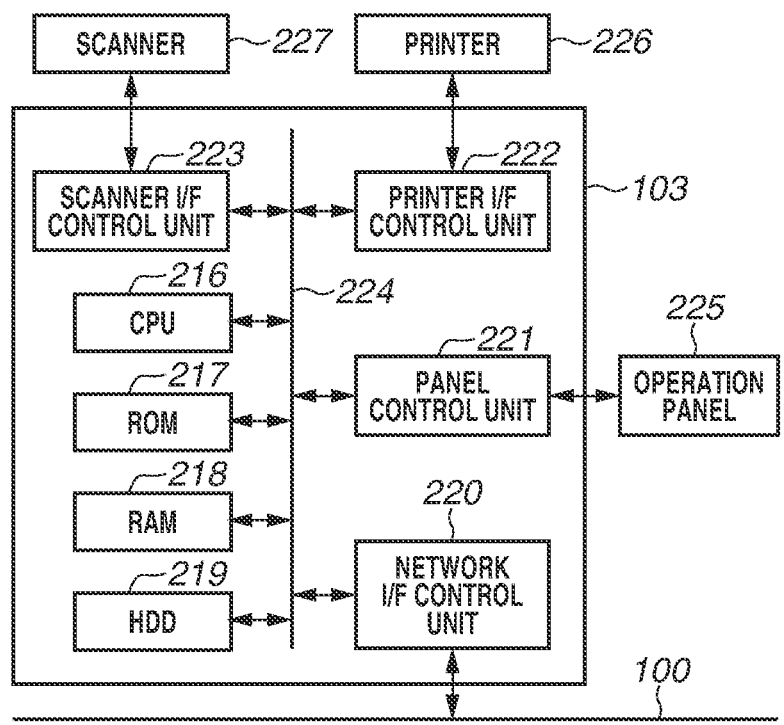

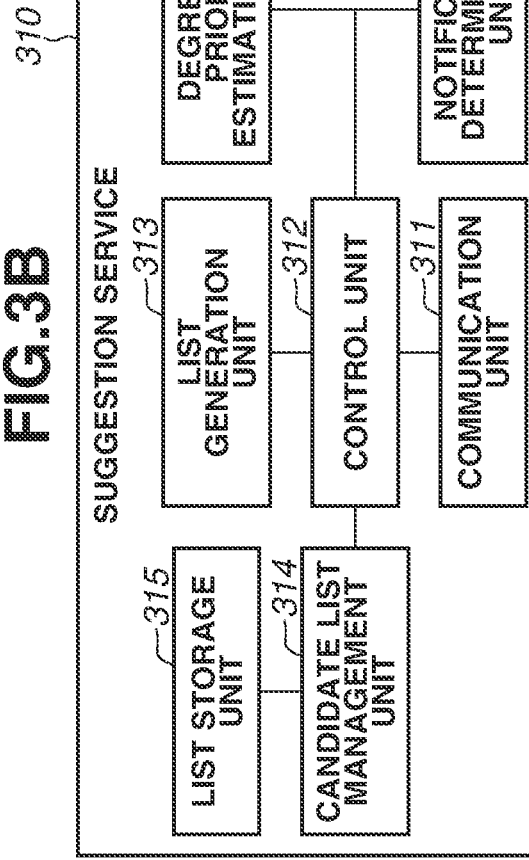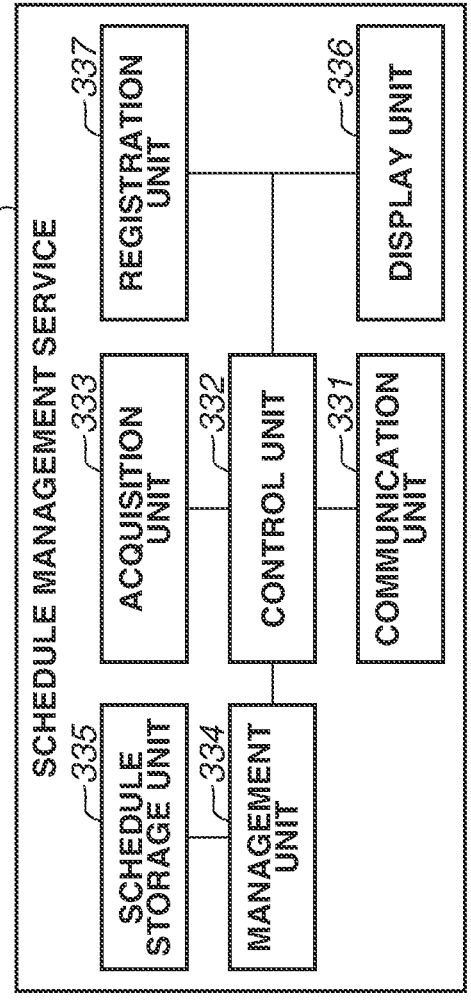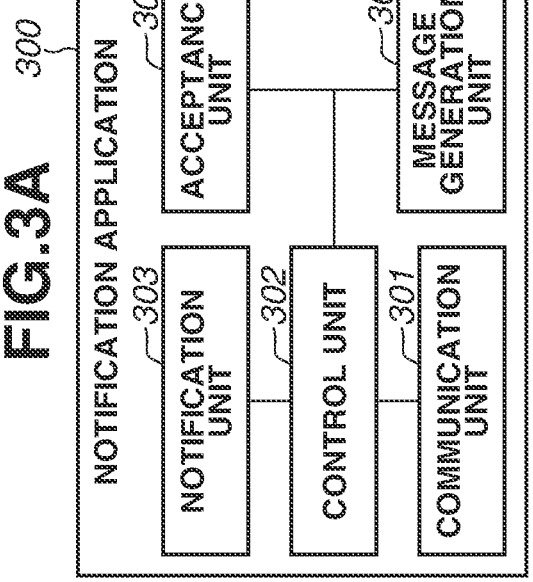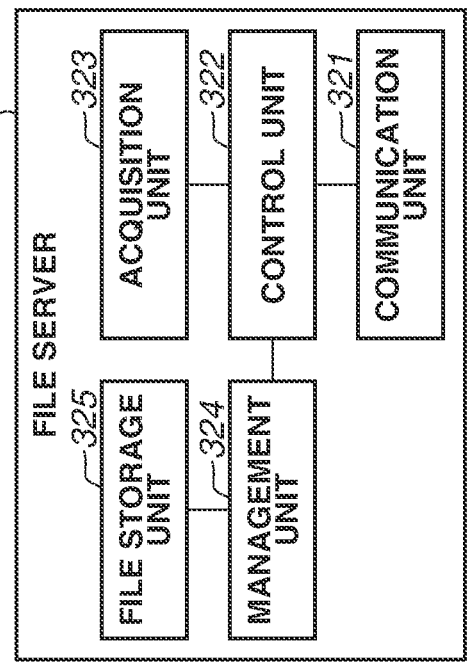

FIG.7

```
{
  "type": "printSuggest",
  "timestamp": "2021-10-18T09:00:00Z",
  "body": {
    "message": "",
    "suggest": {
      "count": "4",
      "list": [
        {
          "fileId": "10000001",
          "fileName": "XXXXXX.docx",
          "fileType": "docx",
          "reason": "10/18 15:00 Materials for meeting A",
          "filePath": "http://123.45.67.89/doc/meeting/20211018/"
        },
        {
          "fileId": "10000002",
          "fileName": "XXXXXX.pptx",
          "fileType": "pptx",
          "reason": "10/18 15:00 Shared file for meeting A",
          "filePath": "http://123.45.67.89/doc/shared/MeetingA/"
        },
        {
          "fileId": "10000008",
          "fileName": "XXXXXX.pdf",
          "fileType": "pdf",
          "reason": "10/22 11:00 Materials for meeting G",
          "filePath": "http://123.45.67.89/doc/meeting/20211022"
        },
        {
          "fileId": "10000004",
          "fileName": "XXXXXX.pptx",
          "fileType": "pptx",
          "reason": "10/20 9:00 Materials for appointment",
          "filePath": "http://123.45.67.89/doc/A_Inc/materials/"
        },
      ]
    }
  }
}
```

FIG.10

| | MON<br>OCT 18 | TUE<br>OCT 19 | WED<br>OCT 20 | THU<br>OCT 21 | FRI<br>OCT 22 |
|---|---|---|---|---|---|
| 8:00 | | | | | |
| | | MORNING ASSEMBLY | APPOINTMENT OUTSIDE | MORNING ASSEMBLY | MORNING ASSEMBLY |
| 9:00 | | | | | |
| 10:00 | | MEETING B | | MEETING E | |
| 11:00 | | | | | MEETING G |
| 12:00 | | | | | |
| 13:00 | | MEETING C | | | |
| 14:00 | | | | | MEETING H |
| 15:00 | MEETING A | | MEETING D | | |
| 16:00 | | | | MEETING F | |
| 17:00 | | | | | |

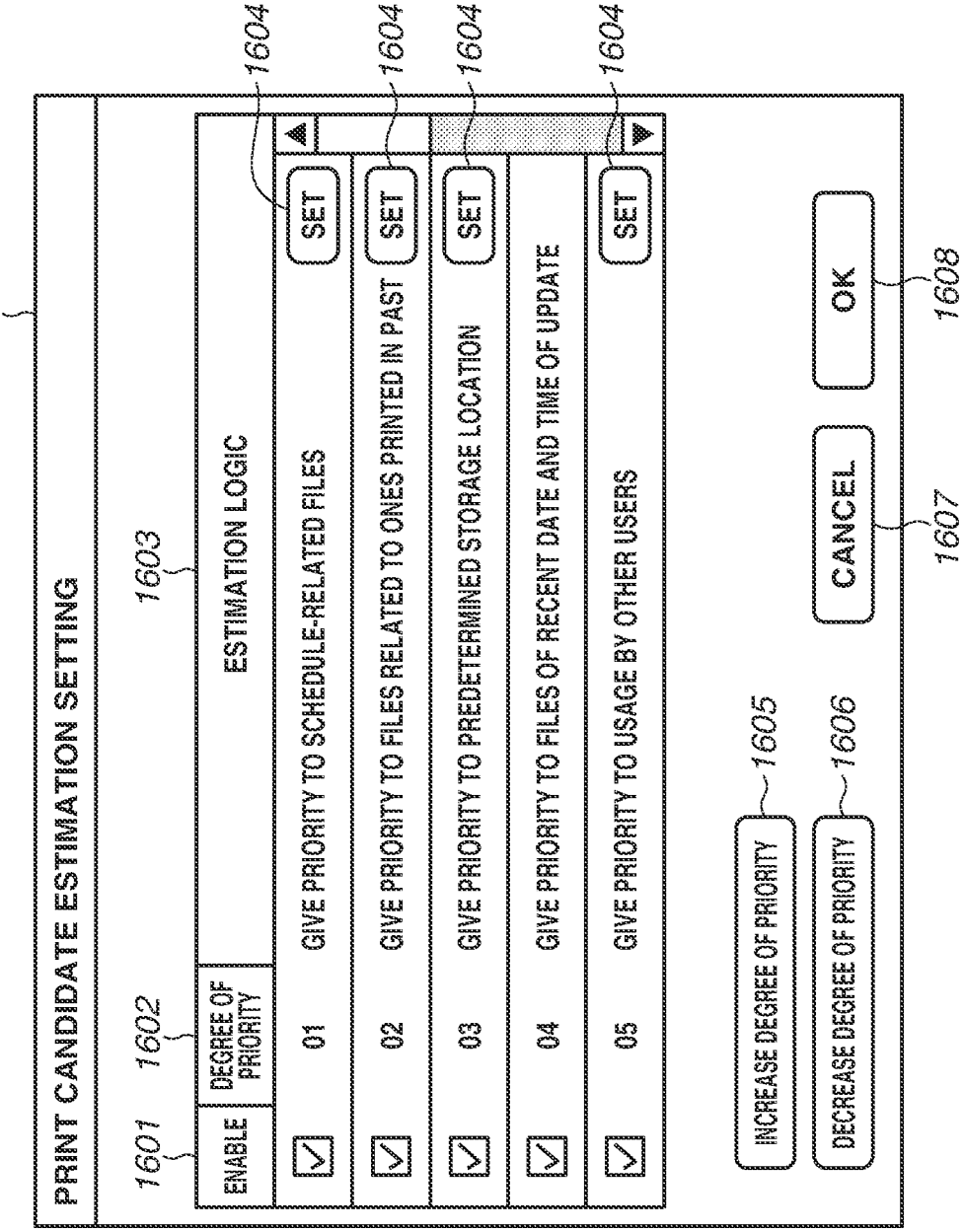

PRINTING SYSTEM, PRINTING METHOD, AND STORAGE MEDIUM FOR IDENTIFYING PRINT DATA CANDIDATES

BACKGROUND

Field

The present disclosure relates to a printing system, a printing method, and a storage medium.

Description of the Related Art

It has become a common practice to store files in a file server on a network to manage and share the files by a plurality of users. Schedule management services have been also utilized to manage schedules of a plurality of users, and the users access the schedule management service from their own personal computers (PCs) or terminals and browse, edit, and update the schedules of their own and of groups including them. When a meeting is set up as a schedule to be managed by the schedule management service, meeting materials can be attached or the storage locations of the meeting materials on a file server can be described and registered, and the attendees of the meeting can check the materials in advance.

Systems have been provided to facilitate browsing of documents associated with schedules and issuing of instructions to print the documents. A system discussed in Japanese Patent Application Laid-Open No. 2014-232342 includes an image forming apparatus, a schedule management server, and an information terminal. The image forming apparatus has a function of storing documents associated with schedules. The image forming apparatus obtains schedules from the schedule management server, obtains links to the documents stored in association with the schedules, and generates a material list schedule by schedule. The image forming apparatus then registers objects for calling the material lists on the schedules of the schedule management server. When the information terminal obtains a schedule from the schedule management server, the object for accessing the materials associated with the schedule is displayed.

In the system discussed in Japanese Patent Application Laid-Open No. 2014-232342, the user accesses a schedule-managing service, recognizes a schedule, and then checks materials associated with the schedule. Because of the system configuration, the user initially accesses the schedule management server and checks the schedule to check the presence or absence of associated documents, and then determines whether to browse or print the documents.

SUMMARY

Aspects of the present disclosure are directed to reducing the user's time and labor in searching for documents to be printed.

According to an aspect of the present disclosure, a printing system includes a printing apparatus and a server, wherein the printing apparatus is configured to print, based on print data, an image on a sheet, and wherein the server is configured to identify print data candidates and notify a user of the identified print data candidates at a timing based on a time set by a schedule management function, wherein the printing apparatus prints the image on the sheet is based on print data selected by the user from among the notified print data candidates.

Further features will become apparent from the following description of exemplary embodiments with reference to the attached drawings.

BRIEF DESCRIPTION OF THE DRAWINGS

FIGS. 2A to 2C are block diagrams illustrating configuration examples of hardware included in the printing system.

FIGS. 3A to 3D are block diagrams illustrating configuration examples of software included in the printing system.

FIG. 7 is a diagram illustrating a data structure of print suggestion data.

FIG. 10 is a diagram illustrating an example of a schedule provided by a schedule management service.

FIG. 16 is a diagram illustrating an example of a setting screen.

DESCRIPTION OF THE EMBODIMENTS

Exemplary embodiments will be described in detail below with reference to the drawings. The following exemplary embodiments are not intended to limit the claims, and all combinations of features described in the exemplary embodiments are not necessarily indispensable.

Figure 1:
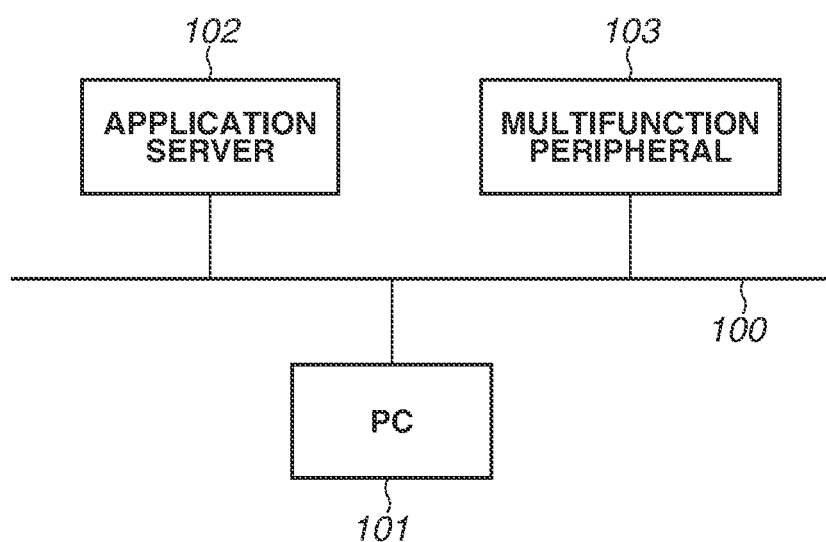
FIG. 1 is a block diagram illustrating a configuration example of a network-connected printing system.

FIG. 1 is a block diagram illustrating a network configuration example of devices connected as a printing system according to a first exemplary embodiment. A personal computer (PC) 101, an application server 102, and a multifunction peripheral 103 are connected to each other via a network 100 to communicate with each other.

The PC 101, which is an information processing apparatus, is used by a user. The PC 101 has functions of browsing and editing files shared by a file server included in the multifunction peripheral 103, which is a printing apparatus or an image forming apparatus, and issuing print instructions via the network 100. The PC 101 also has the function of browsing and editing a schedule registered in a schedule management service running on the application server 102. The PC 101 has the function of running an application for accepting print candidates from a suggestion service running on the application server 102, and notifying the user of print suggestions.

The application server 102 on which the schedule management service and the suggestion service run communicates with both the PC 101 and the multifunction peripheral 103 via the network 100. The schedule management service on the application server 102 is a schedule management function of managing the schedules of access users, and includes functions of responding to schedule browsing from the PC 101 and the addition and editing of schedules. The suggestion service has functions of communicating with the schedule management service and the file server running on the multifunction peripheral 103, estimating print candidates for the user, and notifying the PC 101 of the print candidates.

The multifunction peripheral 103 is a device that prints print data received via the network 100 on actual sheets using known printing techniques, such as electrophotography and inkjet techniques. The multifunction peripheral 103 has functions of reading a paper document via a scanner, copying the read document, and converting the read document into image data and transmitting the image data using an email. The multifunction peripheral 103 can be an apparatus having the printer function without the scanner function. The multifunction peripheral 103 has a file server function and can internally manage files. The multifunction peripheral 103 also has a function of responding to file access requests from the PC 101 and the application server 102 via the network 100.

FIGS. 2A to 2C are block diagram illustrating hardware configurations of the PC 101, application server 102, and multifunction peripheral 103 of the printing system according to the present exemplary embodiment.

FIG. 2A is a block diagram illustrating a schematic hardware configuration of the PC 101. A central processing unit (CPU) 201 executes software programs of the PC 101 and controls the operation of the PC 101. A read-only memory (ROM) 202 stores a boot program, fixed parameters, and the like of the PC 101. A random access memory (RAM) 203 is used to store programs and temporary data when the CPU 201 controls the PC 101. A hard disk drive (HDD) 204 stores system software, applications, and various types of data. The CPU 201 controls operation of the PC 101 by executing the boot program stored in the ROM 202, loading programs stored in the HDD 204 into the RAM 203, and executing the loaded programs. A network interface (I/F) control unit 205 controls data transmission and reception to/from the network 100. A screen output unit 206 controls an image displayed on a display 208 that is a display unit. An operation input unit 207 controls instructions input by the user using a mouse 210 and a keyboard 209 that are operation devices (operation units). The CPU 201, the ROM 202, the RAM 203, the HDD 204, the network I/F control unit 205, the screen output unit 206, and the operation input unit 207 are connected to each other, whereby control signals from the CPU 201 and data signals between the devices are transmitted and received.

FIG. 2B is a block diagram illustrating a schematic hardware configuration of the application server 102.

A CPU 211 executes software programs of the application server 102 and controls the operation of the application server 102. A ROM 212 stores a boot program and fixed parameters of the application server 102. A RAM 213 is used to store programs and temporary data when the CPU 211 controls the application server 102. An HDD 214 stores system software, applications, software of the suggestion service and the schedule management service that run on the application server 102, and various types of data. The CPU 211 controls operation of the application server 102 by executing the boot program stored in the ROM 212, loading programs stored in the HDD 214 into the RAM 213, and executing the loaded programs. A network OF control unit 215 controls data transmission and reception to/from the network 100. The application server 102 controls display of various types of information and input of instructions from the user based on remote access from the PC 101 via the network OF control unit 215. The CPU 211, the ROM 212, the RAM 213, the HDD 214, and the network OF control unit 215 are connected to each other, whereby control signals from the CPU 211 and data signals between the devices are transmitted and received.

FIG. 2C is a block diagram illustrating a schematic hardware configuration of the multifunction peripheral 103. A CPU 216 executes software programs of the multifunction peripheral 103 and controls the operation of the multifunction peripheral 103. A ROM 217 stores a boot program and fixed parameters of the multifunction peripheral 103. A RAM 218 is used to store programs and temporary data when the CPU 216 controls the multifunction peripheral 103. An HDD 219 stores system software, applications, and various types of data. The CPU 216 controls operation of the multifunction peripheral 103 by executing the boot program stored in the ROM 217, loading programs stored in the HDD 219 into the RAM 218, and executing the loaded programs. A network OF control unit 220 controls data transmission and reception to/from the network 100. A scanner I/F control unit 223 controls reading of a document by a scanner 227 that is a reading unit. A printer OF control unit 222 controls print processing by a printer 226 that is a printing unit. The printer 226 can print an image on a sheet based on print data. A panel control unit 221 controls an operation panel 225 of a touchscreen type, and controls display of various types of information and input of instructions from the user. A bus 224 connects the CPU 216, the ROM 217, the RAM 218, the HDD 219, the network OF control unit 220, the scanner OF control unit 223, the printer OF control unit 222, and the panel control unit 221 to each other. Control signals from the CPU 216 and data signals between the devices are transmitted and received via the bus 224.

FIGS. 3A to 3D are block diagrams illustrating software modules included in the PC 101, the application server 102, and the multifunction peripheral 103 of the printing system according to the present exemplary embodiment. More specifically, the following description discusses an example where a notification application 300 runs on the PC 101, a suggestion service 310 and a schedule management service 330 run on the application server 102, and a file server 320 runs on the multifunction peripheral 103.

FIG. 3A is a block diagram illustrating software modules of the notification application 300 running on the PC 101 according to the present exemplary embodiment. The notification application 300 illustrated in FIG. 3A is implemented by the CPU 201 executing programs loaded into the RAM 203. A communication unit 301 controls the network OF control unit 205 connected to the network 100 to transmit and receive data to/from the PC 101 via the network 100. A control unit 302 controls the operation in the notification application 300 to receive and control data received by the communication unit 301 and control transmission of data external to the PC 101 via the communication unit 301. The control unit 302 also instructs a message generation unit 304 to generate a message based on the received data, issues a notification of the generated message via the notification unit 303, and receives an operation accepted by an acceptance unit 305 and determines the next operation. The notification unit 303 displays a print suggestion notification screen on the display 208 via the screen output unit 206. The message generation unit 304 generates a screen, on which the notification unit 303 issues a notification, based on print suggestion data 700 received by the communication unit 301. The message generation unit 304 determines a message from a message type described in the print suggestion data 700, determines the configuration of the message, and configures configuration information to be described in the message using information read from the print suggestion data 700. The acceptance unit 305 determines the content of instructions issued by the user operating the keyboard 209 and the mouse 210 with respect to the screen that is displayed on the display 208 by the notification unit 303, and has been accepted by the operation input unit 207, and requests control corresponding to the determination from the control unit 302.

FIG. 3B is a block diagram illustrating software modules of the suggestion service 310 running on the application server 102 according to the present exemplary embodiment. The suggestion service 310 illustrated in FIG. 3B is implemented by the CPU 211 executing programs loaded into the RAM 213. A communication unit 311 controls the network OF control unit 215 connected to the network 100 to transmit and receive data to/from outside via the network 100. A control unit 312 controls the operation in suggestion service 310 to receive and control data received by the communication unit 311 and control transmission of data external to the application server 102 via the communication unit 311.

The control unit 312 also instructs a candidate list management unit 314 to manage print candidate lists (print candidate file lists), instructs a list generation unit 313 to generate a print candidate list, instructs a degree of priority estimation unit 317 to estimate degrees of priority on the print candidate lists, and receives a print suggestion notification timing from a notification determination unit 316. The list generation unit 313, when instructed by the control unit 312, generates a list of files accessible to an instructed target user. The list generation unit 313 accesses the file server 320 via the communication unit 311, obtains files accessible to the target user from among the files managed by the file server 320, and registers the obtained files in a list. The candidate list management unit 314 controls recording of the print candidate list generated by the list generation unit 313 in a list storage unit 315 via the control unit 312. When a list acquisition request is accepted from the control unit 312, the candidate list management unit 314 obtains a list corresponding to the request from the list storage unit 315, and notifies the control unit 312 of the obtained list. The list storage unit 315 stores print candidate lists in the HDD 214, and reads and rewrites the print candidate lists based on requests. The notification determination unit 316 performs notification determination processing for determination of the print suggestion notification timing (hereinafter, may be referred to as notification timing) and issuing a notification instruction. The notification determination unit 316 accepts user-by-user notification settings from the control unit 312, and determines the notification timing based on the notification settings. In the determination of the notification timing, the notification determination unit 316 regularly makes a notification determination using a not-illustrated timer of the application server 102, and performs a notification determination based on each user's schedule via the communication unit 311. The degree of priority estimation unit 317 reads a print candidate list and estimates the degrees of priority of candidates recorded on the print candidate list. In determination of the degrees of priority, the degree of priority estimation unit 317 obtains user information, file information and file attributes managed by the file server 320, and the user's schedule managed by the schedule management service 330, and determines the degree of priority of each candidate on the print candidate list based on the obtained information.

FIG. 3C is a block diagram illustrating software modules of the file server 320 running on the multifunction peripheral 103 according to the present exemplary embodiment. The file server 320 illustrated in FIG. 3C is implemented by the CPU 216 executing programs loaded into the RAM 218. A communication unit 321 controls the network OF control unit 220 connected to the network 100 to transmit and receive data to/from the multifunction peripheral 103 via the network 100. A control unit 322 controls the operation in the file server 320 to receive and control data received by the communication unit 321 and control transmission of data external to the multifunction peripheral 103 via the communication unit 321. The control unit 322 also instructs an acquisition unit 323 to acquire a file list managed by the file server 320, and instructs a management unit 324 to manage reading and writing of files managed in the file server 320. The acquisition unit 323, when instructed by the control unit 322, acquires the instructed contents related to files, and generates information to be transmitted to the request source as a response. Examples of file-related acquisition instructions that can be accepted include instructions to acquire the files themselves, the storage locations of the files, and attribute information, such as a file format and a file size. The acquisition unit 323 controls reading and acquisition of the accepted contents from the management unit 324. The management unit 324 accepts file read and write instructions and controls reading and recording from/to a file storage unit 325 via the control unit 322. The file storage unit 325 records files in the HDD 219, and reads and rewrites the files based on requests.

FIG. 3D is a block diagram illustrating software modules of the schedule management service 330 running on the application server 102 according to the present exemplary embodiment. The schedule management service 330 illustrated in FIG. 3D is implemented by the CPU 211 executing programs loaded into the RAM 213. A communication unit 331 controls the network OF control unit 215 connected to the network 100 to transmit and receive data to/from the multifunction peripheral 103 via the network 100. A control unit 332 controls the operation in the schedule management service 330 to receive and control data received by the communication unit 331 and control transmission of data external to the multifunction peripheral 103 via the communication unit 331. The control unit 332 also instructs a management unit 334 to manage schedules, instructs an acquisition unit 333 to acquire a requested schedule, instructs a registration unit 337 to register a schedule, and obtains information for displaying a requested user's schedule from a display unit 336. The acquisition unit 333 that, in response to a schedule acquisition request accepted from the communication unit 331 via the control unit 332, acquires the requested schedule from the management unit 334 and generates a response. The management unit 334 accepts requests to obtain, update, generate, and delete a schedule from the control unit 332, and manages reading and recording of a schedule storage unit 335. The schedule storage unit 335 records schedules in the HDD 214, and reads and rewrites the schedules based on requests. The display unit 336 performs control to accept a schedule display request accepted from the communication unit 331 via the control unit 332, obtain schedule information, convert the schedule information into a displayable format, and return the result as a response. The registration unit 337 is a unit that accepts a schedule registration request accepted from the communication unit 331 via the control unit 332, checks the consistency of the registration content, and issues a recording instruction to the management unit 334.

Figure 4:
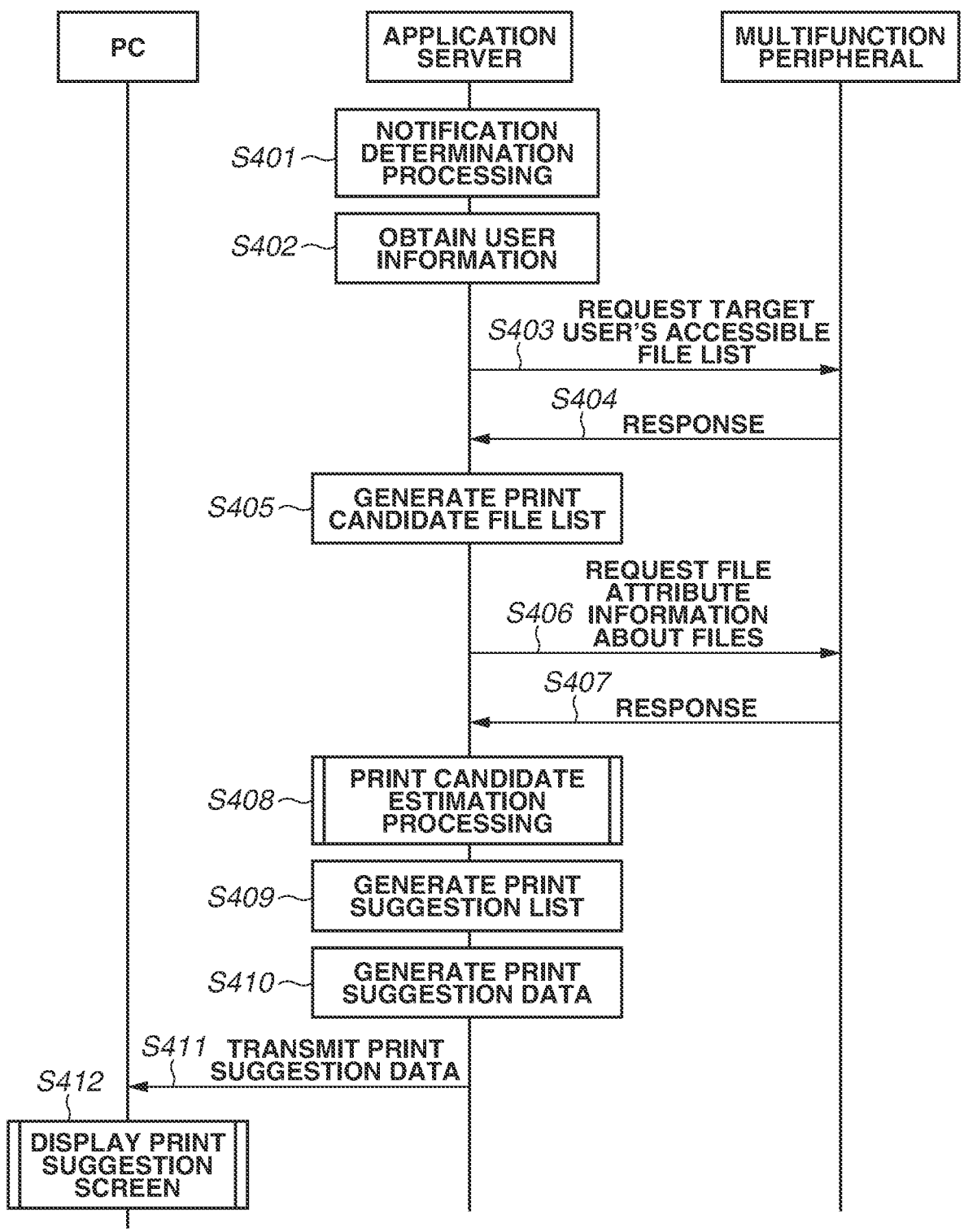
FIG. 4 is a sequence diagram illustrating a procedure for print suggestion notification processing.

FIG. 4 is a sequence diagram illustrating a processing procedure of the printing system according to the present exemplary embodiment. More specifically, the procedure includes the suggestion service 310 determining the notification timing and estimates print candidates and the PC 101 displaying a print candidate list.

As described above, in the present exemplary embodiment, the PC 101, the application server 102, and the multifunction peripheral 103 constitute the printing system. The PC 101 is an information terminal that the user operates and on which the notification application 300 for displaying a print candidate list runs. The suggestion service 310 that determines print suggestion notification timing and estimating print candidates and the schedule management service 330 for managing users' schedules run on the application server 102. The file server 320 that stores files and shares the files between the PC 101 and the application server 102 runs on the multifunction peripheral 103. The multifunction peripheral 103 also performs acceptance and print control on user operations and print instructions.

While, in the present exemplary embodiment, the PC 101, the application server 102, and the multifunction peripheral 103 are separate apparatuses, in another exemplary embodiment, the suggestion service 310 and the schedule management service 330 can be included in the multifunction peripheral 103. In another exemplary embodiment, the file server 320 running on the multifunction peripheral 103 can run on the application server 102. In still another exemplary embodiment, the suggestion service 310, the file server 320, and the schedule management service 330 can run on an independent server, on other on-premises servers, or on cloud services.

The series of processing of the sequence is performed by the PC 101, the application server 102, and the multifunction peripheral 103 of the printing system. The processing of the PC 101 is performed by the notification application 300 running on a control program that has been read from the ROM 202 and loaded into the RAM 203 by the CPU 201 of the PC 101. The processing of the application server 102 is performed by the suggestion service 310 and the schedule management service 330 running on a control program that has been read from the ROM 212 and loaded into the RAM 213 by the CPU 211 of the application server 102. The processing of the multifunction peripheral 103 is performed by a control program that has been read from the ROM 217 and loaded into the RAM 218 by the CPU 216 of the multifunction peripheral 103.

The processing sequence starts when the suggestion service 310 running on the application server 102 performs a notification determination.

In step S401, the suggestion service 310 performs notification determination processing. Details of the notification determination processing will be described below with reference to FIG. 13. In a case where, in the notification determination processing, the suggestion service 310 determines to perform notification processing, the processing proceeds to step S402.

In step S402, the suggestion service 310 obtains information (user information) about the user to estimate print candidates. The suggestion service 310 reads information about the user who has registered for a print candidate notification in advance. The processing then proceeds to step S403. The user information obtained in the present processing can be from a service that manages user information about users of the PC 101 and the multifunction peripheral 103.

In step S403, the suggestion service 310 requests a list of files that the target user can access (accessible file list) from the file server 320 on the multifunction peripheral 103 using the user information obtained in step S402. The processing then proceeds to step S404. Table 1 illustrates registered entries in an accessible file list. Accessible file lists are generated user by user, and list files and folders accessible to the respective users. An accessible file list stores filenames, types, and information about storage locations on the file server 320.

TABLE 1

Accessible File List

| Filename | Type | Location |
| --- | --- | --- |
| XXXXXX.docx | docx | //Srv/doc/meeting/20211018/ |
| XXXXXX.pptx | pptx | //Srv/doc/shared/MeetingA/ |
| XXXXXX.pdf | pdf | //Srv/doc/meeting/20211022/ |
| XXXXXX.pptx | pptx | //Srv/doc/A_Inc/materials/ |

In step S404, the file server 320 generates an accessible file list of files accessible to the user based on the accepted user information, and notifies the suggestion service 310 of the accessible file list as a response. The suggestion service 310 records the accepted accessible file list in the RAM 213. The processing then proceeds to step S405.

In step S405, the suggestion service 310 reads the accessible file list recorded in step S404, and determines whether each of the files on the list is a print candidate. The suggestion service 310 generates an identifier (ID) for uniquely identifying each file to be a print candidate, generates a print candidate file list in which file IDs, filenames, types, and storage locations are recorded, and records the print candidate file list in the RAM 213. The processing then proceeds to step S406. Whether a file is a print candidate is determined, for example, based on the types of files to be printed, such as a text (txt) format, a word format, and a Portable Document Format (pdf) format. Aside from the file types, the print candidates can be determined based on the filenames and the storage locations of the files.

In step S406, the suggestion service 310 reads the print candidate file list stored in the RAM 213, and requests the file server 320 to obtain attribute information about each file on the print candidate file list. The processing then proceeds to step S407. The attribute information about the files requested to be obtained includes the date and time of update, a creator, a page setting, and the number of pages of each file. The suggestion service 310 can specify which attribute information to return, or request the file server 320 to collectively return information managed as file attribute information.

In step S407, the file server 320 obtains the file attribute information about each file requested, and notifies the suggestion service 310 of the file attribute information as a response. The suggestion service 310 adds the accepted file attribute information to the print candidate file list, and stores the print candidate file list in the HDD 214. The processing then proceeds to step S408.

The print candidate file list will now be described with reference to Table 2. The print candidate file list is a list on which files determined to be print candidates in step S404 on the accessible file list are recorded. The suggestion service 310 records the IDs for uniquely identifying the files, generated in step S405, as well as the filenames, types, and locations into print candidate file list. The file attribute information obtained in step S407 is also recorded in print candidate file list. The file attribute information includes the date and time of update, the creator, the page setting, and the number of pages of each file. Depending on the type of the file, the file attribute information does not include some items, such as page setting or number of pages. In such a case, a value indicating non-applicability is registered.

TABLE 2

Print Candidate File List

| ID | Filename | Type | Location | Date and time of update | Creator | Page setting | Number of pages |
|---|---|---|---|---|---|---|---|
| 1001 | XXXXXX.docx | docx | //Srv/doc/meeting/20211018/ | 2021 Oct. 15 11:49 | UserA | A4 | 12 |
| 1002 | XXXXXX.pptx | pptx | //Srv/doc/shared/MeetingA/ | 2021 Oct. 16 11:49 | UserA | — | 4 |
| 1005 | XXXXXX.pdf | pdf | //Srv/doc/meeting/20211022/ | 2021 Oct. 17 11:49 | UserA | A4 | 6 |
| 1004 | XXXXXX.pptx | pptx | //Srv/doc/A_Inc/materials/ | 2021 Oct. 18 11:49 | UserA | — | 20 |

Returning to FIG. 4, in step S408, the suggestion service 310 performs print candidate estimation processing. Details of the print candidate estimation processing will be described below with reference to FIG. 5. As a result of the completion of the print candidate estimation processing, the suggestion service 310 stores an estimation result list in the HDD 214. The processing then proceeds to step S409. The estimation result list will now be described with reference to Table 3. In the print candidate estimation processing, the IDs for identifying the files, the degrees of priority that are the result of the print candidate estimation processing on the respective files, and reasons for priority indicating information based on which the degrees of priority are determined are recorded on the estimation result list. In this example, the degree of priority is expressed by a value of 0 to 10. The greater the numerical value, the higher the degree of priority. The value of 0 indicates a case where the file is not applicable as a print candidate. The reasons for priority are determined by the print candidate estimation processing, and thus the reasons for priority are related schedule information since the degrees of priority are determined based on schedules. The criteria for determining the degrees of priority in the print candidate estimation processing are not limited thereto, and the degrees of priority can be determined depending on the content of the print candidate estimation processing.

TABLE 3

Estimation Result List

| ID | Degree of priority | Reason for Priority |
|---|---|---|
| 1001 | 10 | 10/18 15:00 Materials for meeting A |
| 1002 | 9 | 10/18 15:00 Shared file for meeting A |
| 1005 | 8 | 10/22 11:00 Materials for meeting G |
| 1004 | 7 | 10/20 9:00 Materials for appointment |

In step S409, the suggestion service 310 obtains a predetermined number of items from the top of the estimation result list stored as a result of the print candidate estimation processing in step S408. The suggestion service 310 then obtains file information about the files included in the obtained items from the print candidate file list, and generates a print suggestion list. This enables identification of print data candidates from among data that is set by the schedule management function in association with the user and times. The suggestion service 310 stores the generated print suggestion list in the RAM 213. The processing proceeds to step S410. The number of items on the print suggestion list can be changed depending on the number of items on the print candidate file list. The suggestion service 310 can accept the number of items on the print suggestion list set by the user, and use the number. Table 4 illustrates an example of the print suggestion list (list of print data candidates). The suggestion service 310 obtains the IDs, filenames, types, and locations of the files determined to be suggested for printing (print data candidates) from the print candidate file list, obtains the reasons for priority from the estimation result list, and generates the print suggestion list.

TABLE 4

Print Suggestion List

| ID | Filename | Type | Location | Reason for priority |
|---|---|---|---|---|
| 1001 | XXXXXX.docx | docx | //Srv/doc/meeting/ 20211018/ | 10/18 15:00 Materials for meeting A |
| 1002 | XXXXXX.pptx | pptx | //Srv/doc/shared/ MeetingA/ | 10/18 15:00 Shared file for meeting A |
| 1005 | XXXXXX.pdf | pdf | //Srv/doc/meeting/ 20211022/ | 10/22 11:00 Materials for meeting G |
| 1004 | XXXXXX.pptx | pptx | //Srv/doc/A_Inc/ materials/ | 10/20 9:00 Materials for appointment |

In step S410, the suggestion service 310 generates print suggestion data using data on the print data candidates stored in the print suggestion list. FIG. 7 illustrates details of a data structure of the print suggestion data. The processing then proceeds to step S411.

In step S411, the suggestion service 310 transmits the print suggestion data to the notification application 300 installed on the PC 101. The processing then proceeds to step S412. This enables notification of the print data candidates (print suggestion list) based on the notification timing set on a print suggestion notification setting screen 1201 illustrated in FIG. 12. In the example of FIG. 4, the print data candidates (print suggestion list) are identified and the notification processing is performed at the notification timing (when it is determined by the notification determination processing that the notification processing is performed). This is not seen to be limiting. For example, the print data candidates can be identified in advance, and thus a notification of the print data candidates can be issued promptly at the notification timing (when the notification processing is determined to be performed in the notification determination processing).

In step S412, the notification application 300 performs processing for displaying a print suggestion screen based on the notified print data candidates (print suggestion data).

Details of the processing for displaying the print suggestion screen will be described below with reference to FIG. 8. When the print suggestion screen is displayed, this sequence ends.

Figure 5:
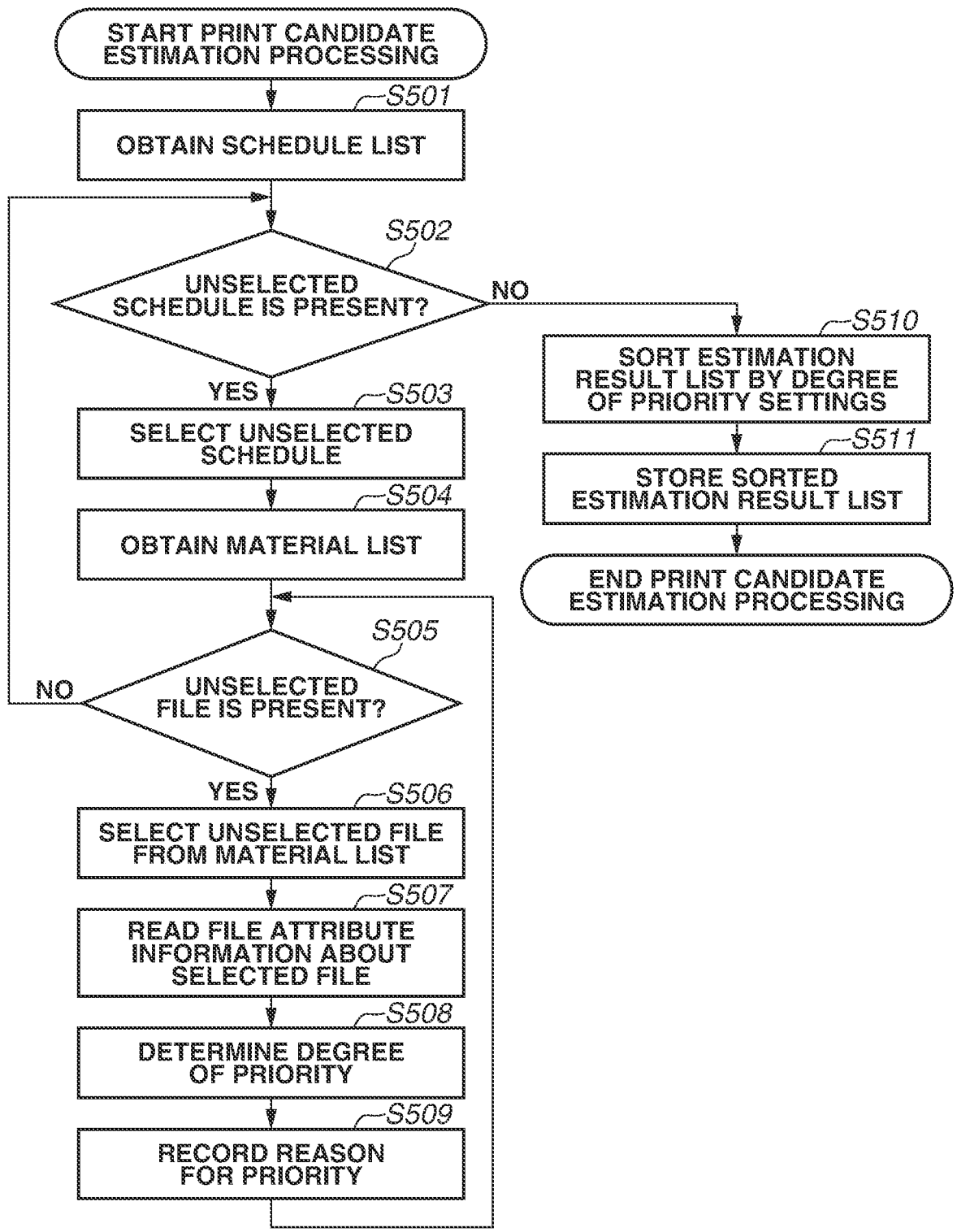
FIG. 5 is a flowchart illustrating a procedure for print candidate estimation processing.

FIG. 5 is a flowchart illustrating the print candidate estimation processing in step S408 of FIG. 4. This processing is performed by the suggestion service 310 and the schedule management service 330 running on the control program that has been read from the ROM 212 and loaded into the RAM 213 by the CPU 211 of the application server 102.

In step S501, the suggestion service 310 requests the schedule management service 330 to obtain the target user's schedule list. The suggestion service 310 then accepts the schedule list as a response from the schedule management service 330, and records the schedule list in the RAM 213. The processing then proceeds to step S502. The schedule list from the schedule management service 330 can be requested by specifying only the user or by specifying a period, like schedules for one week after the date of acquisition.

In step S502, the suggestion service 310 determines whether there is an unselected schedule in the schedule list recorded in the RAM 213. In a case where there is an unselected schedule (YES in step S502), the processing proceeds to step S503. In a case where there is no unselected schedule (NO in step S502), the processing proceeds to step S510.

In step S503, the suggestion service 310 selects an unselected schedule having the start date and time closest to the date of acquisition from the schedule list in the RAM 213. The processing then proceeds to step S504.

In step S504, the suggestion service 310 collects information related to a file or files registered in schedule information about the selected schedule, and generates a material list. The material list is generated by obtaining the file(s) recorded in a material item of the schedule information and, in a case where storage location information about the file(s) is included in detailed information, obtaining the storage location information. In a case where a folder is specified as the storage location information in the detailed information, the suggestion service 310 can perform processing for obtaining a list of files stored in the folder from the file server 320. The suggestion service 310 generates the material list, and records the generated material list in the RAM 213. The processing then proceeds to step S505.

In step S505, the suggestion service 310 determines whether there is an unselected file on the material list recorded in the RAM 213. In a case where there is an unselected file (YES in step S505), the processing proceeds to step S506. In a case where there is no unselected file (NO in step S505), the suggestion service 310 discards the material list from the RAM 213 and the processing returns to step S502.

In step S506, the suggestion service 310 selects an unselected file on the material list recorded in the RAM 213. The processing then proceeds to step S507.

In step S507, the suggestion service 310 reads the print candidate file list from the HDD 214, searches the print candidate file list for the file selected in step S506, and reads the file attribute information about the file. The processing then proceeds to step S508.

In step S508, the suggestion service 310 determines the degree of priority from the schedule information about the selected file and the read file attribute information. The suggestion service 310 records the degree of priority determined in this processing into the RAM 213 as the estimation result list along with the file ID. The processing then proceeds to step S509.

In step S509, the suggestion service 310 determines the reason for priority that has been used in the determination of the degree of priority in step S508. As employed herein, the reason for priority used in the determination of the degree of priority is information indicating that the file is recorded in association with a schedule, and thus the suggestion service 310 determines the reason for priority based on the schedule information and the file attribute information. For example, in a case where a file is registered as an accompanying material for meeting A starting at 15:00 on Oct. 18, 2021, information such as "10/18 15:00 Materials for meeting A" is determined as the reason for priority. The suggestion service 310 records the reason for priority determined in this processing into an item of reason for priority on the estimation result list. The processing then returns to step S505.

In step S510, the suggestion service 310 sorts the estimation result list stored in the RAM 213 by degree of priority settings. The processing then proceeds to step S511. In a case of a candidate having no degree of priority setting, the degree of priority of the candidate is determined to be lower than those of candidates having degree of priority settings.

In step S511, the suggestion service 310 stores the estimation result list sorted in step S510 into the HDD 214. The processing then ends.

Figure 6:
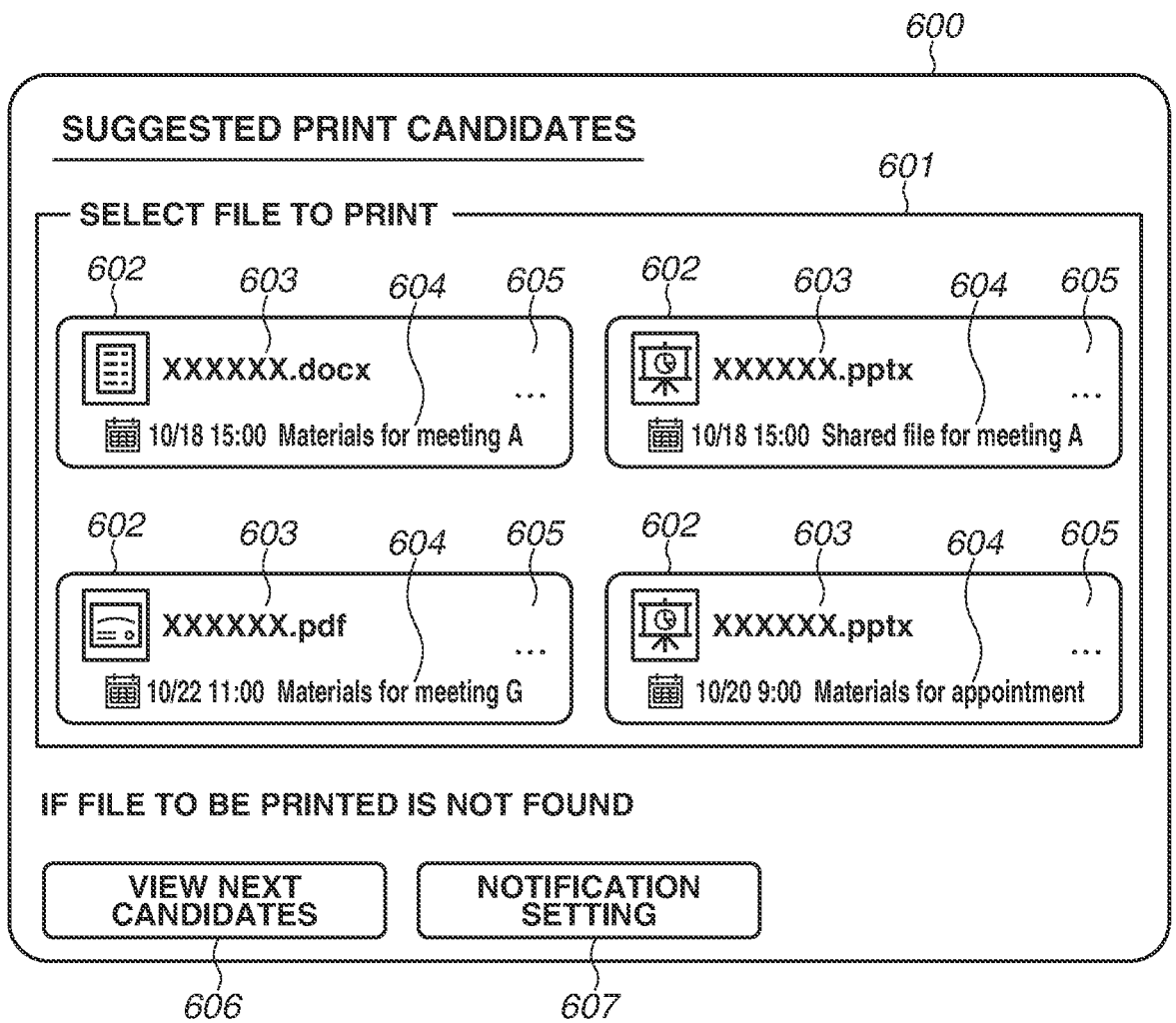
FIG. 6 is a diagram illustrating an example of a print suggestion screen.

FIG. 6 illustrates an example of the print suggestion screen displayed by the notification application 300 to the user. The print suggestion screen is displayed on the display 208 of the PC 101. The print suggestion screen can be displayed as a pop-up screen on the PC 101 or as a notification issued by a chat application or a collaboration tool running on the PC 101. In other words, the notification application 300 can be a chat application. In a case where the chat application is notified of print data candidates, the print data candidates are displayed in a talk room of the chat application. In the case of notifying the chat application installed on the PC 101 of the print data candidates, the print data candidates are transmitted to a chat server providing the chat service. The chat server then transmits information about the talk room where the print data candidates are posted to the chat application on the PC 101.

A print suggestion screen 600 is a selection screen including a print suggestion file display area 601, a plurality of pieces of print suggestion file information 602 in the print suggestion file display area 601, a view next candidates button 606, and a notification setting button 607. The print suggestion file display area 601 is an area for displaying the print suggestion file information 602. The number of pieces of print suggestion file information 602 to be displayed is determined based on the print suggestion data notified in step S410. In the illustrated example, four pieces of print suggestion file information 602 are displayed. Each piece of the print suggestion file information 602 is an area displayed for a file notified as a print candidate, and includes a filename 603 of the file suggested to be printed, suggestion information 604, and a file operation button 605. The filename 603 and the suggestion information 604 are displayed based on the information about the print suggestion data. The file operation button 605 is a button to be selected in a case where the user wants to operate the target file. Examples of the operation on the target file can include issuing instructions to obtain the file, open the file, and print the file. The view next candidates button 606 is a button for issuing, in a case where the user wants to view print candidates other than the files displayed in the print suggestion file display area 601, an instruction to display next candidates to the notification application 300. The notification setting button 607 is a button for instructing the notification application 300 to set print suggestion notification settings. The print suggestion notification settings will be described in detail below with reference to FIG. 12.

FIG. 7 is a diagram illustrating an example of the data structure of the print suggestion data. The print suggestion data 700 describes a notification content of a print suggestion in a single data structure. In the illustrated example, the print suggestion data 700 is output in a JavaScript Object Notation (JSON) format. However, the format is not limited to this example, and any format is applicable as long as a notification is expressed by a single data structure. The print suggestion data 700 includes basic information 701 and print suggestion information 702. The basic information 701 includes the type of this data and the date and time of transmission of the data. The print suggestion information 702 includes the number of files described as print data candidates, the IDs, filenames, formats, and locations of the files to be displayed as the print data candidates, and the reasons for naming the files as print candidates. A plurality of print candidates can be listed and registered as the information about the files in the print suggestion information. As many pieces of information as the number of files are registered. In a case where four print data candidates are registered, four documents are displayed as illustrated in FIG. 6. The number of print data candidates can be freely determined, and can be changed by the suggestion service 310 depending on the estimation results of print candidates. The number of print candidates to be notified of by a single notification can be set by the user.

Figure 8:
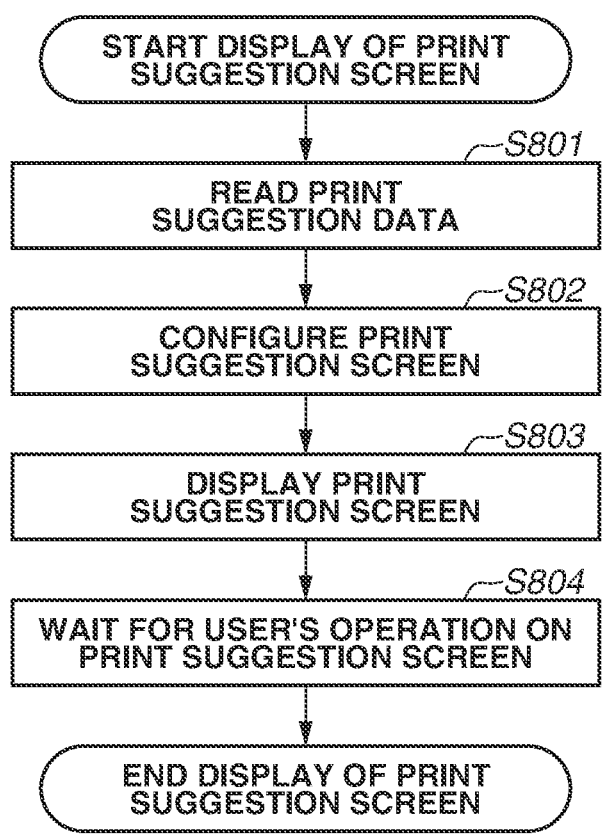
FIG. 8 is a flowchart in controlling of display of the print suggestion screen.

FIG. 8 is a flowchart illustrating the processing for displaying the print suggestion screen in step S412 of FIG. 4.

This processing is implemented by the CPU 201 of the PC 101 executing the notification application 300 running on the control program that has been read from the ROM 202 and loaded in the RAM 203.

In step S801, the notification application 300 reads the print suggestion data received from the suggestion service 310 from the RAM 203. The processing then proceeds to step S802.

In step S802, the notification application 300 reads the print suggestion information 702 to be displayed on the print suggestion screen from the print suggestion data. The notification application 300 configures the print suggestion screen 600 based on the print suggestion information 702, and records the configured data of the print suggestion screen 600 in an area of the RAM 203 to be used for display of the notification application 300. The processing then proceeds to step S803.

In step S803, the notification application 300 displays the print suggestion screen 600 recorded in the RAM 203 on the display 208 via the screen output unit 206. The processing then proceeds to step S804.

In step S804, the notification application 300 waits for the user's operation on the print suggestion screen 600 via the operation input unit 207. The processing then ends.

Figure 9:
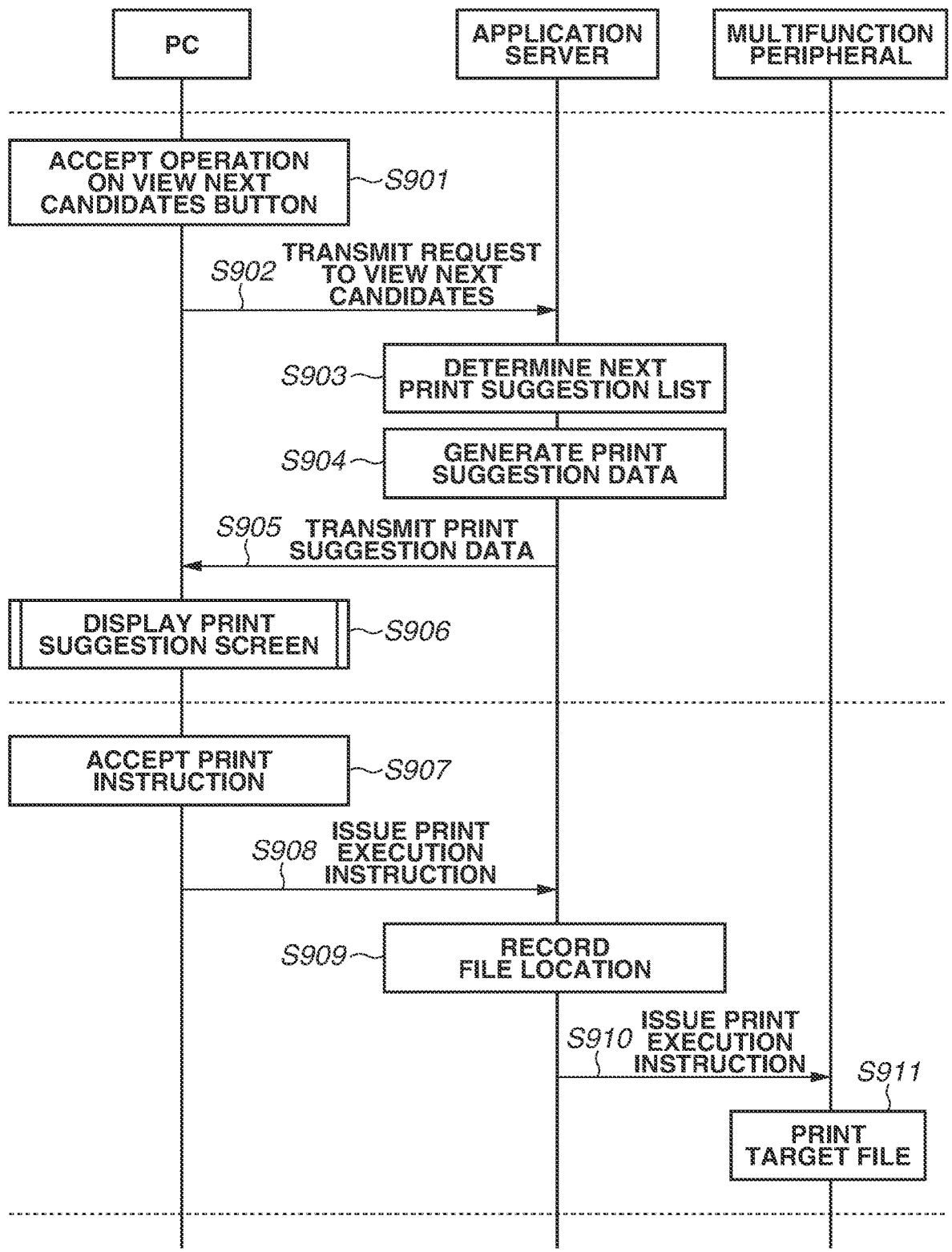
FIG. 9 is a sequence diagram illustrating a processing procedure in accepting of an operation after print suggestion notification.

FIG. 9 is a diagram illustrating a sequence where the print suggestion screen 600 of FIG. 6 is presented to the user and then the user's operation is accepted in step S412 of FIG. 4.

The sequence starts with the notification application 300 on the PC 101 displaying the print suggestion screen 600 in step S412. In the following sequence, operations in a case where the user selects the view next candidates button 606 of the print suggestion screen 600 will be described with reference to steps S901 to S906.

In step S901, the notification application 300 accepts the user's operation via the operation input unit 207. Determination of the accepted operation is performed by the acceptance unit 305, and the acceptance unit 305 determines that the accepted operation is an instruction issued by an operation on the view next candidates button 606. The processing then proceeds to step S902.

In step S902, the notification application 300 transmits a request to view next candidates to the suggestion service 310. The suggestion service 310 accepts the request to view next candidates. The processing then proceeds to step S903.

In step S903, the suggestion service 310 performs processing for determining the next print suggestion list. The suggestion service 310 excludes the items selected for the present print suggestion list from the estimation result list stored in step S511. From among the remaining items, the suggestion service 310 obtains a predetermined number of items having higher-ranked degrees of priority in the estimation result list from the top, generates the next print suggestion list, and stores the generated print suggestion list in the RAM 213. The processing then proceeds to step S904.

In step S904, the suggestion service 310 generates print suggestion data using the next print suggestion list stored in step S903. The processing then proceeds to step S905.

In step S905, the suggestion service 310 transmits the next print suggestion data to the notification application 300 running on the PC 101. The processing then proceeds to step S906.

In step S906, the notification application 300 displays the print suggestion screen 600 based on the notified next print suggestion data. The processing described with reference to FIG. 8 is performed here as print suggestion screen display processing.

The processing sequence to this point illustrates operations for receiving a print suggestion notification and requesting next print suggestion not included in the print suggestions. The processing of step S901 and the subsequent steps can be repeated for subsequent print suggestion(s) in response to re-selection of the view next candidates button 606.

Next, operations in a case where the user issues a print instruction using a file operation button 605 in a specific piece of print suggestion file information 602 on the print suggestion screen 600 will be described with reference to steps S907 to S911.

In step S907, the notification application 300 accepts the user's selection of a print data candidate from among the displayed print data candidates via the operation input unit 207, and accepts a print instruction for the selected print data candidate. The acceptance unit 305 determines that the accepted instruction is a print instruction, and the processing proceeds to step S908.

In step S908, the notification application 300 instructs the suggestion service 310 to print the target file. The suggestion service 310 accepts the print execution instruction. The processing then proceeds to step S909.

In step S909, the suggestion service 310 searches the print candidate file list for the file for which the print execution instruction is accepted, and records print executed information. The suggestion service 310 identifies the location of the file on the file server 320 from the file information about the file for which the print execution instruction is accepted, and records the file location in the RAM 213. The processing then proceeds to step S910.

In step S910, the suggestion service 310 specifies the location of the target file and instructs the multifunction peripheral 103 to print the target file. The processing then proceeds to step S911.

In step S911, the multifunction peripheral 103 accepts the file print instruction, obtains the target file from the file server 320, and prints the target file. The sequence then ends.

Since a print log can be kept on the print candidate list on the suggestion service 310 by the notification application 300 issuing the print instruction, the degree of priority can be determined based on the recorded information.

FIG. 10 is a diagram illustrating a display example of a schedule 1000 that is transmitted to the PC 101 by the schedule management service 330 that accepted a schedule inquiry from the PC 101. The schedule 1000 includes columns for date, and each of the columns is sectioned by time. A thick-framed time display area with letters displayed inside represents the date and time of a registered appointment. The schedule management service 330 accepts selection of such an appointment and displays a detailed setting screen for the selected appointment.

Figure 11:
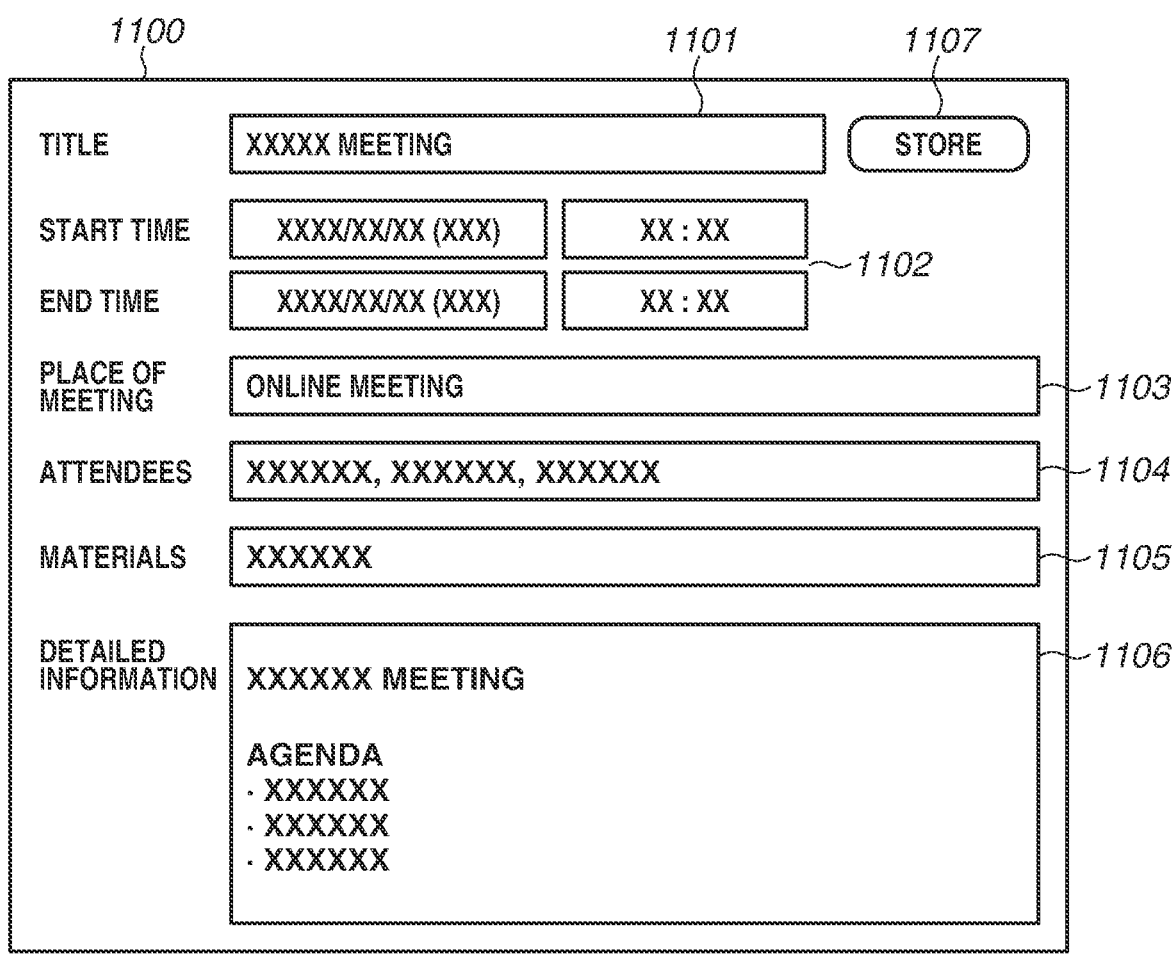
FIG. 11 is a diagram illustrating details of the schedule provided by the schedule management service.

FIG. 11 is a diagram illustrating an example of the detailed setting screen for an appointment. Like the schedule 1000 of FIG. 10, the PC 101 receives the detailed setting screen from the schedule management service 330 and displays the detailed setting screen on the display 208. An appointment 1100 includes the following settings: an appointment title 1101, meeting times 1102, a place of meeting 1103, attendees 1104, materials 1105, detailed information 1106, and a store button 1107. The appointment title 1101 appears on the schedule 1000 as an appointment. The meeting times 1102 display a start time and an end time separately. The same appointment is registered for each user registered in the attendees 1104. The materials 1105 is a field where meeting materials can be directly attached or links to the materials on the file server 320 can be registered. While one material description field is displayed in the present exemplary embodiment, the number of material description fields displayed can be changed depending on the number of materials to be attached. The detailed information 1106 can describe detailed information about the appointment. The links to the material files to be used at the appointment or folders containing the material files can also be described in this field. In a case where the user selects the store button 1107, the PC 101 notifies the schedule management service 330 to store the described content as an appointment, and the content is stored in the HDD 214 of the application server 102 on which the schedule management service 330 runs. The users registered in the attendees 1104 can browse the details of the stored appointment. The above arrangement enables the schedule management function to register one or more pieces of data in association with an appointment including a start time and an end time.

Information indicating the user who registers the appointment 1100 is also associated with and registered in the appointment 1100.

Figure 12:
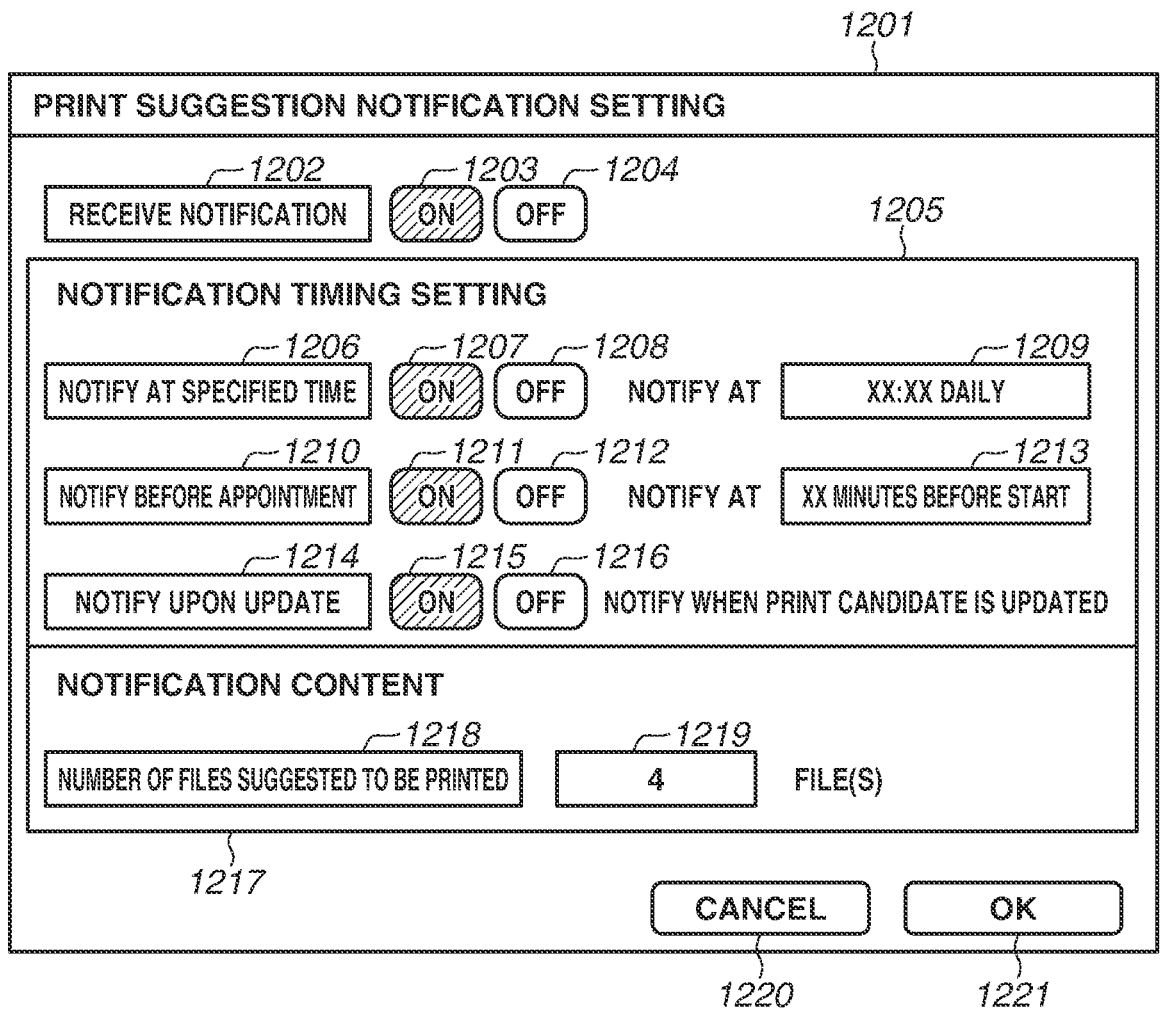
FIG. 12 is a diagram illustrating an example of a notification setting screen.

FIG. 12 illustrates an example of a screen for print suggestion notification setting, which is displayed on the display 208. The control unit 302 of the notification application 300 stores the set items in the HDD 204 of the PC 101. The control unit 302 also notifies the suggestion service 310 of the set items via the communication unit 301, whereby the print suggestion notification settings and the settings set by the user are registered together.

The print suggestion notification setting screen 1201 includes a receive-notification setting 1202 and notification timing settings 1205. The receive-notification setting 1202 includes an ON button 1203 and an OFF button 1204 that can be exclusively selected. In a case where the ON button 1203 is selected, the notification timing settings 1205 and a notification content setting 1217 become settable. In a case where the OFF button 1204 is selected, the notification timing settings 1205 and the notification content setting 1217 become unsettable. In the state where the notification timing settings 1205 and the notification content setting 1217 are not settable, the display can be shaded to indicate that the settings are unable to be set. The notification timing settings 1205 include a notify-at-specified-time setting 1206, a notify-before-appointment setting 1210, and a notify-upon-update setting 1214. The notification content setting 1217 includes a number of files suggested-to-be-printed setting 1218.

The notify-at-specified-time setting 1206 is a setting for issuing a print suggestion notification at a specific time, and includes an ON button 1207, an OFF button 1208, and a specified time setting 1209 that is activated when the ON button 1207 is selected. The specified time setting 1209, which is settable when the ON button 1207 is selected, can specify the time to issue a print suggestion notification. The notify-before-appointment setting 1210 is a setting for issuing a print suggestion notification before a start of an appointment registered in the schedule management service 330. The notify-before-appointment setting 1210 includes an ON button 1211, an OFF button 1212, and a pre-start time setting 1213 that is activated when the ON button 1211 is selected. The pre-start time setting 1213, which is settable when the ON button 1211 is selected, is an item for setting the time to issue a notification before the start time of an appointment registered in the schedule management service 330 by the user. This enables notification of print data candidates at timing based on the start time of a meeting set by the schedule management function.

The notify-upon-update setting 1214 is a setting for issuing a notification when a document associated with an appointment registered in the schedule management service 330 is added or updated. The notify-upon-update setting 1214 includes an ON button 1215 and an OFF button 1216. The number of files suggested-to-be-printed setting 1218 of the notification content setting 1217 is a setting for specifying the number of files to be notified of by a print suggestion. A number of files setting 1219 can be used to set the number of files to be notified of Print data candidates can be notified of based on the number of files setting 1219. In a case where the number of files setting 1219 is set to "4" as in FIG. 12, four print data candidates can be notified of. In a case where there are more print data candidates than the set number, four print data candidates are selected in descending order of the degrees of priority.

In a case where a cancel button 1220 is selected, the settings being set on the print suggestion notification setting screen 1201 at the point of the selection are discarded, and the print suggestion notification setting screen 1201 is closed. In a case where an OK button 1221 is selected, the settings being set on the print suggestion notification setting screen 1201 at the point of the selection are stored, and the print suggestion notification setting screen 1201 is closed.

Figure 13:
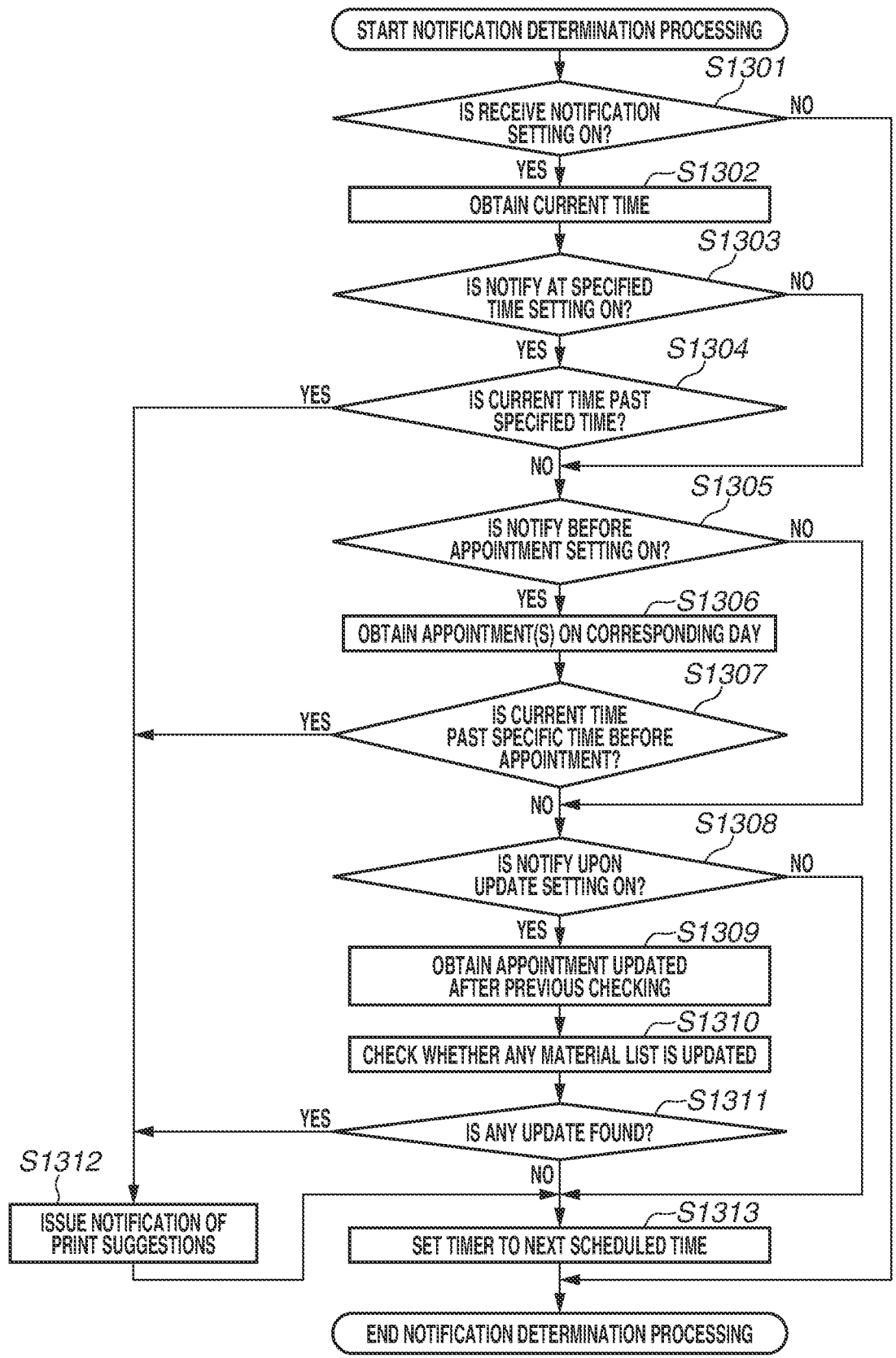
FIG. 13 is a flowchart illustrating a procedure for notification determination processing.

FIG. 13 is a flowchart illustrating the notification determination processing in step S401 of FIG. 4 according to the present exemplary embodiment. The series of processing is implemented by the CPU 211 of the application server 102 executing the suggestion service 310 running on the control program that has been read from the ROM 212 and loaded into the RAM 213.

In step S1301, the notification determination unit 316 determines whether the receive-notification setting 1202 in the print suggestion notification setting screen 1201 of the target user is ON. In a case where the receive-notification setting 1202 is ON (YES in step S1301), the processing proceeds to step S1302. In a case where the receive-notification setting 1202 is OFF (NO in step S1301), the processing ends.

In step S1302, the notification determination unit 316 obtains the current time, and stores the current time in the RAM 213. The processing then proceeds to step S1303.

In step S1303, the notification determination unit 316 determines whether the notify-at-specified-time setting 1206 in the print suggestion notification setting screen 1201 is ON. In a case where the notify-at-specified-time setting 1206 is ON (YES in step S1303), the processing proceeds to step S1304. In a case where the notify-at-specified-time setting 1206 is OFF (NO in step S1303), the processing proceeds to step S1305.

In step S1304, the notification determination unit 316 compares the time (specified time) set at the specified time setting 1209 of the notify-at-specified-time setting 1206 with the current time stored in the RAM 213 in step S1302. In a case where the current time is past the specified time (YES in step S1304), the processing proceeds to step S1312. In a case where the current time is not past the specified time (NO in step S1304), the processing proceeds to step S1305.

In step S1305, the notification determination unit 316 determines whether the notify-before-appointment setting 1210 in the print suggestion notification setting screen 1201 is ON. In a case where the notify-before-appointment setting 1210 is ON (YES in step S1305), the processing proceeds to step S1306. In a case where the notify-before-appointment setting 1210 is OFF (NO in step S1305), the processing proceeds to step S1308.

In step S1306, the notification determination unit 316 obtains the target user's appointment(s) on the corresponding day from the schedule management service 330 via the communication unit 311.

In step S1307, the notification determination unit 316 compares a time or times obtained by subtracting the time set at the pre-start time setting 1213 of the notify-before-appointment setting 1210 from the start time(s) of the target user's appointment(s) on the corresponding day with the current time stored on the RAM 213. In a case where the current time is past the time in advance of the appointment (YES in step S1307), the processing proceeds to step S1312. In a case where the current time is not past the time in advance of the appointment (NO in step S1307), the processing proceeds to step S1308.

In step S1308, the notification determination unit 316 determines whether the notify-upon-update setting 1214 in the print suggestion notification setting screen 1201 is ON. In a case where the notify-upon-update setting 1214 is ON (YES in step S1308), the processing proceeds to step S1309. In a case where the notify-upon-update setting 1214 is OFF (NO in step S1308), the processing proceeds to step S1313.

In step S1309, the notification determination unit 316 obtains an appointment that has been updated after the previous checking, if any, from the schedule management service 330 via the communication unit 311. The processing proceeds to step S1310.

In step S1310, the notification determination unit 316 obtains the appointment(s) on the corresponding day from the schedule management service 330 via the communication unit 311, and obtains a material list or lists associated with the appointment(s). To check whether the material list(s) has/have been updated, the notification determination unit 316 then obtains the dates of update of the materials on the material list(s) from the file server 320 via the communication unit 311. The notification determination unit 316 determines whether any of the materials has been updated after the previous checking. The processing then proceeds to step S1311.

In step S1311, the notification determination unit 316 determines whether any update is found in steps S1309 and S1310. In a case where the notification determination unit 316 determines that there is an update (YES in step S1311), the processing proceeds to step S1312. In a case where the notification determination unit 316 determines that there is no update (NO in step S1311), the processing proceeds to step S1313.

In step S1312, the notification determination unit 316 determines that it is time to issue a print suggestion notification, and requests the control unit 312 to notify the target user of the print suggestion. The processing then proceeds to step S1313.

In step S1313, the notification determination unit 316 determines a scheduled time to perform the notification determination processing next time, and sets the timer such that the notification determination processing starts at the scheduled time. The processing then ends. In the present exemplary embodiment, the notification determination timing is implemented by executing the notification determination processing using the timer. In another exemplary embodiment, depending on the settings, the notification determination processing can be executed based on externally generated instructions.

With the foregoing system operation, the user is notified of the print candidate list at the system-determined timing and determines whether to perform printing based on the notification content. This can reduce the user's time and labor in checking schedules and searching material storages for materials to be printed.

In the present exemplary embodiment, the file server 320 is included in the multifunction peripheral 103. In another exemplary embodiment, for example, the application server 102 can include the file server 320. In such a case, the print data candidates are stored in the application server 102, and the processing of steps S403, S404, S406, and S407 in FIG. 4 is performed in the application server 102.

In the present exemplary embodiment, print candidates are estimated based on the schedule information registered in the schedule management service 330, and are notified to the notification application 300 on the PC 101 that is used by the user. However, there may be instances where documents that the user regards as print candidates may not be registered in association with a schedule. This can result in it taking time and labor to search for such documents not registered in association with a schedule.

In a second exemplary embodiment, control of estimation of print candidates is performed using information about file allocation on a file server, file operation and update histories, and a print history as well as schedule information registered in the schedule management service 330.

In the present exemplary embodiment, redundant descriptions of configurations similar to those of the first exemplary embodiment, such as the network configuration diagram and the hardware and software configurations of the information processing apparatus, will be omitted.

Figure 14:
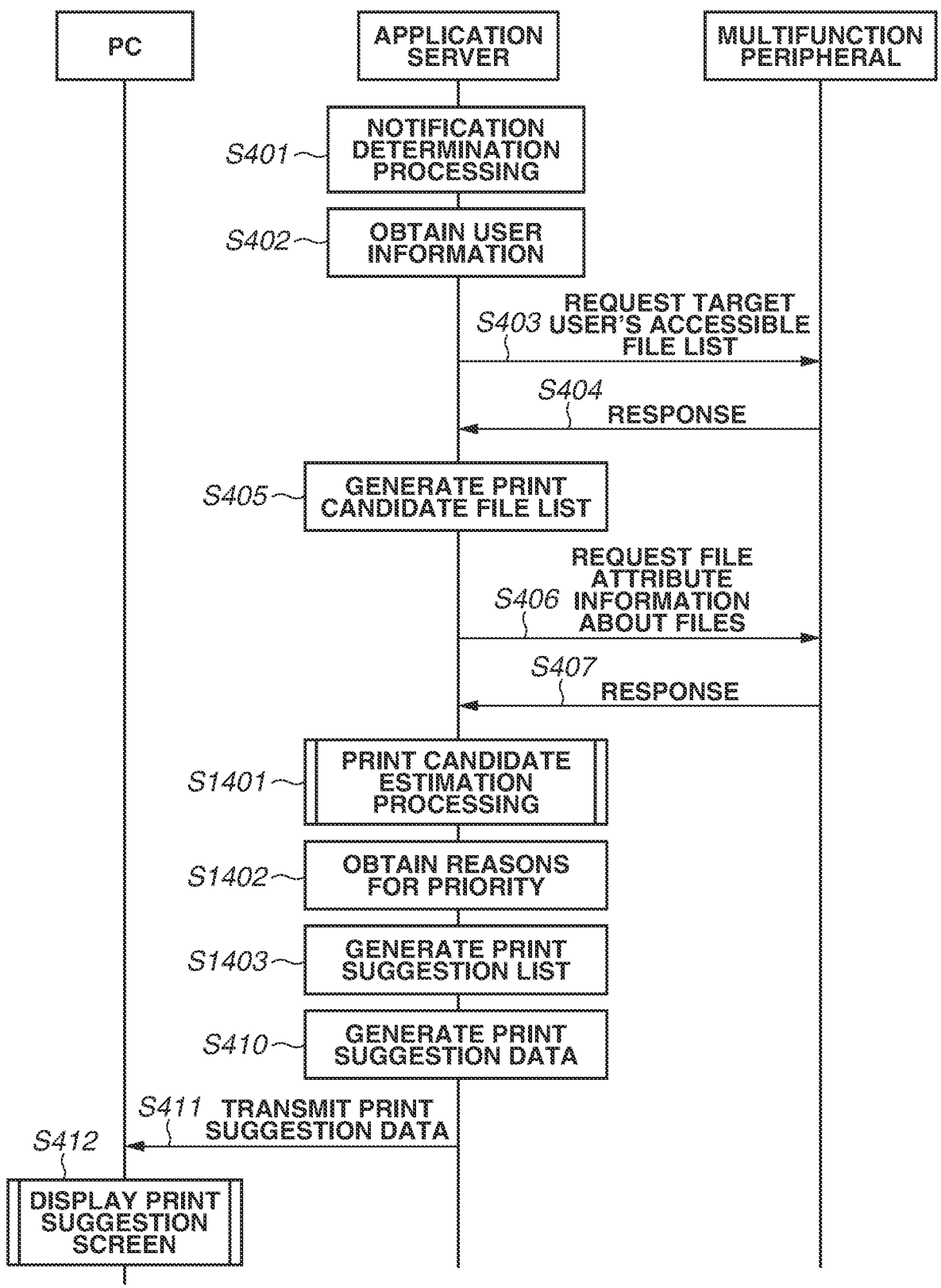
FIG. 14 is a sequence diagram illustrating a procedure for the print suggestion notification processing.

FIG. 14 is a sequence diagram illustrating an the processing procedure of a printing system according to the present exemplary embodiment, where a suggestion service 310 determines a notification timing and estimates print candidates, and a PC 101 displays a print suggestion screen.

The present exemplary embodiment has a similar system configuration to that of FIG. 4 in the first exemplary embodiment. The series of processing of this sequence is performed by the PC 101, application server 102, and multifunction peripheral 103 of the printing system. The processing of the PC 101 is performed by a notification application 300 running on a control program that has been read from a ROM 202 and loaded in a RAM 203 by a CPU 201 of the PC 101. The processing of an application server 102 is performed by the suggestion service 310 and a schedule management service 330 running on a control program that has been read from a ROM 212 and loaded in a RAM 213 by a CPU 211 of the application server 102. The processing of a multifunction peripheral 103 is performed by a control program that has been read from a ROM 217 and loaded in a RAM 218 by a CPU 216 of the multifunction peripheral 103.

The sequence starts when the suggestion service 310 on the application server 102 performs a notification determination. In steps S401 to S407, similar processing to that of FIG. 4 is performed. In step S407, the suggestion service 310 receives the response, and the processing proceeds to step S1401.

In step S1401, the suggestion service 310 performs print candidate estimation processing. This print candidate estimation processing implements a plurality of types of estimation logic for estimating print candidates. Details of the print candidate estimation processing will be described below with reference to FIG. 15. After completion of the print candidate estimation processing, the suggestion service 310 stores a summary list that is a result of the print candidate estimation processing in an HDD 214. The processing then proceeds to step S1402.

In step S1402, the suggestion service 310 obtains a predetermined number of items from the top of the summary list stored in the HDD 214. Based on IDs and priority logic of files included in the obtained items, the suggestion service 310 obtains the reasons for priority for the respective files from the logic described in the priority logic. The suggestion service 310 records the obtained reasons for priority in the RAM 213. The processing then proceeds to step S1403. The reasons for priority are obtained by determining logic of the highest degree of priority from among the plurality of types of estimation logic for the respective print candidates and determining reasons for candidate estimation based on the logic. For example, in a case where schedule-based estimation logic has the highest degree of priority, a reason for candidate estimation, for example, "10/18 15:00 Materials for meeting A", is determined as the reason for priority based on the schedule. Alternatively, in a case where estimation logic that gives priority to files related to ones printed in the past has the highest degree of priority, a reason for candidate estimation, for example, "file related to BBBB.pptx printed in the past", can be determined as the reason for priority based on the files printed in the past.

In step S1403, the suggestion service 310 obtains a predetermined number of items from the top of the summary list stored as a result of the print candidate estimation processing in step S1401, obtains file information about the files included in the obtained items from the print candidate file list, and generates a print suggestion list. In the present processing, the reasons for priority stored in step S1402 are recorded into the item of the reasons for priority on the print suggestion list. The generated print suggestion list is stored in the RAM 213. The processing then proceeds to step S410.

The number of items on the print suggestion list can be changed depending on the number of items on the print candidate file list. The setting of the number of items on the print suggestion list can be accepted from the user, and the number can be used.

The processing of step S410 and the subsequent steps is similar to that of FIG. 4. The processing of the present sequence then ends.

Figure 15:
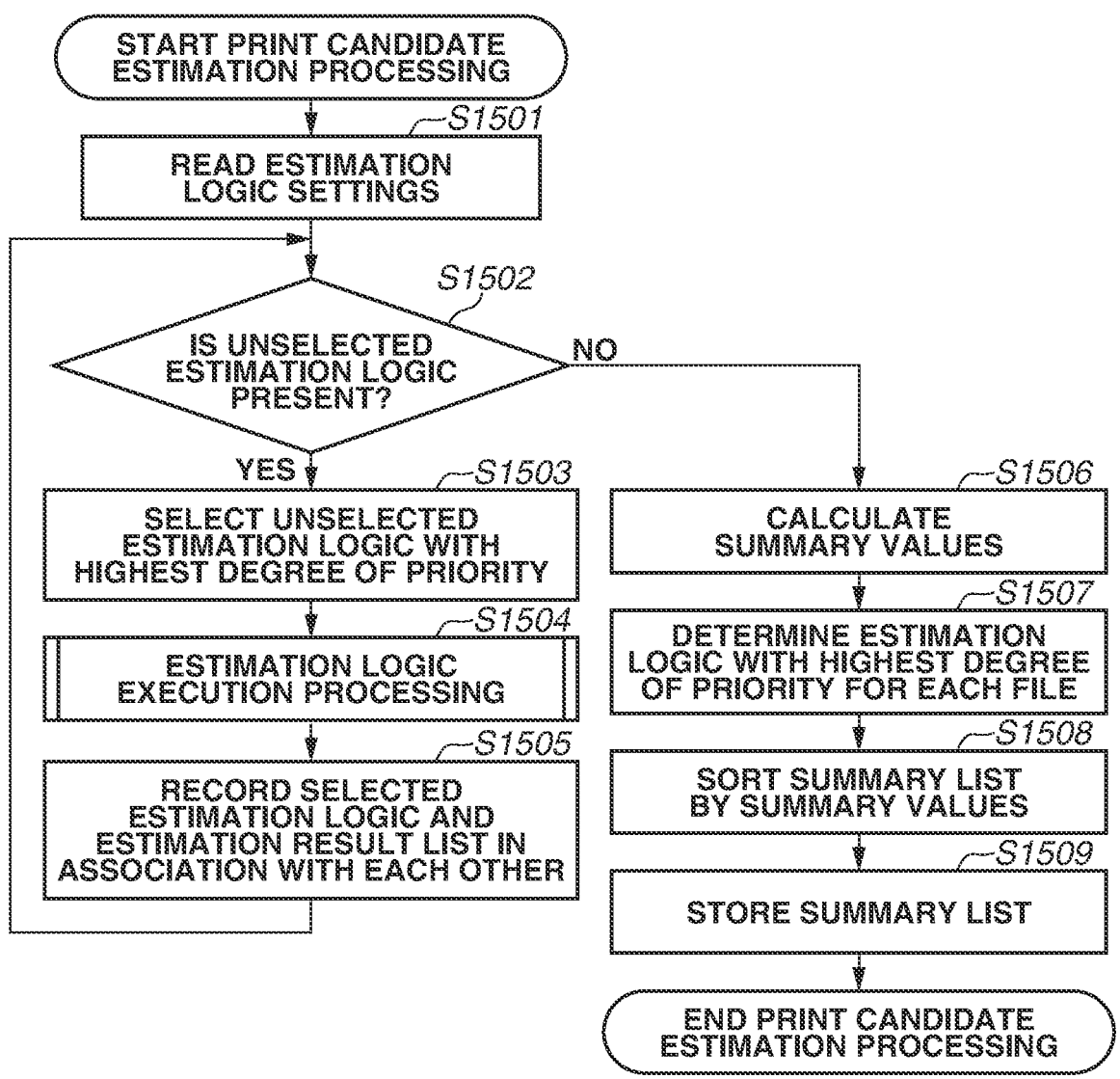
FIG. 15 is a flowchart illustrating a procedure for the print candidate estimation processing.

FIG. 15 is a flowchart illustrating the print candidate estimation processing in step S1401 of FIG. 14.

This processing is performed by the suggestion service 310 running on the control program that has been read from the ROM 212 and loaded into the RAM 213 by the CPU 211 of the application server 102.

In step S1501, the suggestion service 310 reads estimation logic settings that are set via a setting screen 1600. The setting screen 1600 will be described in detail below with reference to FIG. 16. The suggestion service 310 records a list (priority logic list) of types of estimation logic activated from among the read estimation logic settings into the RAM 213 along with the respective estimation logic settings. The processing then proceeds to step S1502.

In step S1502, the suggestion service 310 determines whether there is unselected estimation logic in the priority logic list recorded in the RAM 213. In a case where there is unselected estimation logic (YES in step S1502), the processing proceeds to step S1503. In a case where there is no unselected estimation logic (NO in step S1502), the processing proceeds to step S1506.

In step S1503, the suggestion service 310 selects unselected estimation logic having the highest degree of priority from among unselected estimation logic from the priority logic list in the RAM 213. The processing then proceeds to step S1504.

In step S1504, the suggestion service 310 executes print candidate estimation processing using the selected estimation logic (estimation logic execution processing). Detailed processing of several types of estimation logic will be described below with reference to FIGS. 17A to 17D. The suggestion service 310 obtains an estimation result list generated by the estimation logic execution processing. The processing then proceeds to step S1505.

In step S1505, the suggestion service 310 stores the selected estimation logic and the estimation result list obtained in step S1504 into the RAM 213 in association with each other. The processing then returns to step S1502.

In step S1506, the suggestion service 310 reads the estimation result lists associated with the respective types of estimation logic recorded in the RAM 213, and records the estimation result lists into the summary list. The suggestion service 310 then calculates summary values from the degrees of priority of the respective types of estimation logic on the summary list, and records the summary values into the summary list. Details of the summary list will be described below with reference to FIG. 18. The suggestion service 310 records the summary list into the RAM 213. The processing then proceeds to step S1507. As for summarization, simple sums can be calculated as the summary values of the respective types of estimation logic. Weights can be assigned based on the order of estimation logic before summarization.

In step S1507, the suggestion service 310 reads the summary list recorded in the RAM 213, identifies which of the pieces of the estimation logic has led to the result of the highest degree of priority, for each file on the summary list, and records the identified estimation logic into the summary list as highest priority logic. After recording of the highest priority logic for each file, the suggestion service 310 updates the summary list and records the updated summary list into the RAM 213. The processing then proceeds to step S1508.

In step S1508, the suggestion service 310 reads the summary list recorded in the RAM 213, and sorts the summary list in order based on the summary values on the summary list. In a case where there are the same summary values, the order is determined based on the higher degrees of priority of the respective types of estimation logic. The method for determining the order in situations where the summary values are the same is not limited thereto. The order can be determined by comparing the minimum values of the degrees of priority of the respective types of estimation logic to certain files. The order can be determined based on filenames. The suggestion service 310 stores the summary list sorted to the order based on the summary values into the RAM 213. The processing then proceeds to step S1509.

In step S1509, the suggestion service 310 stores the sorted summary list in the HDD 214 of the application server 102. The processing then ends.

Table 5 illustrates an example of the summary list used in the present exemplary embodiment. The summary list includes the ID of each file to be a print candidate, the degrees of priority derived from the respective types of estimation logic for the file, a summary value that is the overall degree of priority into which the degrees of priority derived from the respective types of estimation logic are summarized, and the number of the estimation logic led to the highest degree of priority (highest priority logic) from among the types of estimation logic.

TABLE 5

Summary List

| File ID | Logic 1 | Logic 2 | Logic 3 | Logic 4 | Logic 5 | Summary Value | Highest Priority Logic |
|---|---|---|---|---|---|---|---|
| 1002 | 8 | 8 | 8 | 8 | 6 | 38 | 1 |
| 1001 | 10 | 6 | 2 | 6 | 8 | 32 | 1 |
| 1003 | 6 | 2 | 10 | 10 | 4 | 32 | 3 |
| 1004 | 4 | 4 | 8 | 4 | 10 | 30 | 5 |
| 1005 | 2 | 10 | 6 | 2 | 2 | 22 | 2 |

The foregoing summary list is for a case where there are five print candidate files and five types of estimation logic are activated. The estimation results of the respective types of estimation logic are listed in order of the degree of priority settings on the setting screen 1600. The summary list can only include estimation logic columns of activated estimation logic. Invalid degrees of priority can also be listed as the estimation results of deactivated estimation logic. The degrees of priority resulting from each type of estimation logic on the summary list are determined by the processing using the estimation logic selected in step S1503. The degrees of priority listed in the present exemplary embodiment are obtained by normalizing the degrees of priority determined using each type of estimation logic to a maximum value of 10 and a minimum value of 1 with a value of 0 for a case where the file is excluded from print candidates. The values can be set based on different standards type by type of estimation logic. The summary values can be calculated based on standards for the respective types of estimation logic. The summary values listed are calculated from the degrees of priority derived from each type of estimation logic in step S1506.

In the present exemplary embodiment, the summary values are calculated by summation. The summary values on the summary list are used to determine files to be selected as print candidates. In the example of Table 5, the file with a file ID of 1002 can be determined to be a file of the highest priority as a print candidate, since 38 is the maximum value among the summary values. Next, the files with file IDs of 1001 and 1003 with the same summary values of 32 are ranked in this order, since the file with the file ID of 1001 is given priority over the file with the file ID of 1003 based on the degrees of priority derived from logic 1 that is the estimation logic of higher priority. The number of the highest priority logic is determined by comparing the degrees of priority derived from the respective types of estimation logic file by file. The estimation logic led to the highest degree of priority is selected as the highest priority logic. In the case of the file with the file ID of 1001, logic 1 led to the degree of priority of 10 is selected as the highest priority logic. In the case of the file with the file ID of 1002 where the degrees of priority derived from several types of estimation logic are the same, the estimation logic of the highest priority is selected. The processing for selecting the highest priority logic is not limited thereto. The highest priority logic can be determined based on the priority of the estimation logic. A plurality of types of estimation logic can be registered as highest priority logic.

FIG. 16 illustrates an example of the setting screen 1600, which is displayed on the display 208. In print candidate estimation setting, the control unit 302 of the notification application 300 displays setting values read from the HDD 204 of the PC 101 as initial values. Operations on the setting screen 1600 are accepted from the mouse 210 via the operation input unit 207.

In a case where an activation button 1601 on the setting screen 1600 is selected, the activation button 1601 is checked and the corresponding estimation logic is applied as estimation logic to be used for print candidate estimation. A degree of priority display 1602 indicates the order of the degrees of priority of respective types of estimation logic 1603. In the present exemplary embodiment, the estimation logic 1603 includes schedule-based estimation, estimation based on a print history, estimation based on a predetermined storage location, estimation based on the date and time of update, and estimation based on usage by other users. In the present exemplary embodiment, in selecting the schedule-based estimation, the estimation based on the print history, the estimation based on a predetermined storage location, and the estimation based on the usage by other users, the selection can be set using respective setting buttons 1604.

In a case where an increase degree of priority button 1605 or a decrease degree of priority button 1606 is selected while a type of estimation logic 1603 is selected, the degree of priority of the selected estimation logic is changed.

In a case where an OK button 1608 is selected, the print candidate estimation settings being set on the setting screen 1600 are stored in the HDD 214 as setting values. The notification application 300 notifies the suggestion service 310 of both the settings and the user performing the settings. In a case where a cancel button 1607 is selected, the notification application 300 terminates the setting screen 1600 without storing the settings being set on the setting screen 1600.

FIGS. 17A to 17D are flowcharts illustrating details of the processing of the estimation logic that can be activated by the print candidate estimation setting. While four estimation processes are described in the present exemplary embodiment, the print candidate estimation processing of FIG. 5 can also be executed as a similar estimation process or a type of estimation logic. This processing is performed by the suggestion service 310 and the schedule management service 330 running on the control program that has been read from the ROM 212 and loaded into the RAM 213 by the CPU 211 of the application server 102.

Figure 17A:
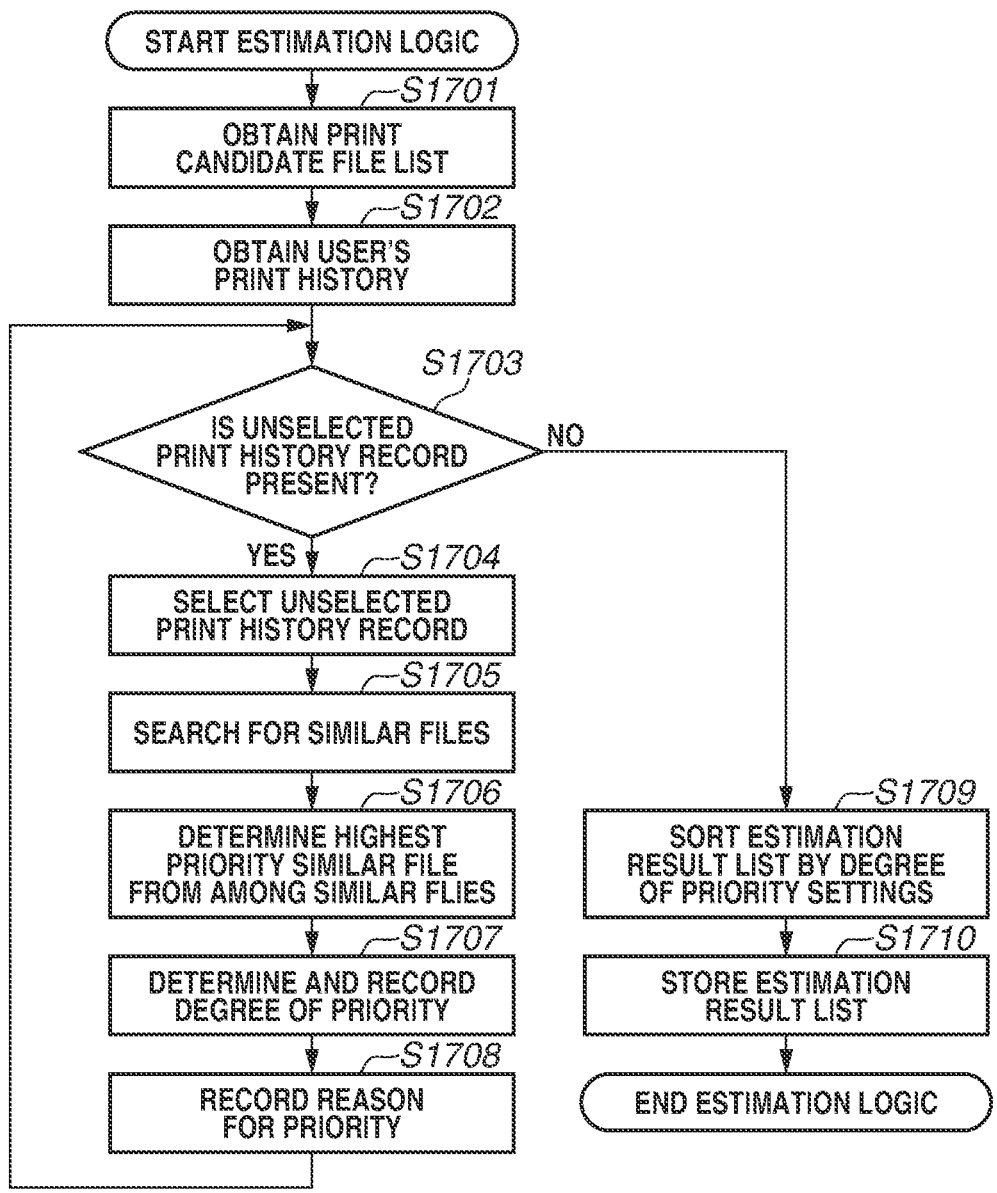
FIGS. 17A to 17D are flowcharts illustrating details of estimation logic execution processing.

FIG. 17A is a flowchart illustrating processing for executing the estimation logic based on the print history, which is a type of estimation logic execution processing in step S1504 of FIG. 15. This processing is performed by the suggestion service 310 running on the control program that has been read from the ROM 212 and loaded into the RAM 213 by the CPU 211 of the application server 102.

In step S1701, the suggestion service 310 reads the print candidate file list from the HDD 214, and records the print candidate file list into the RAM 213. The processing then proceeds to step S1702.

In step S1702, the suggestion service 310 obtains a print history of the concerned user from the file server 320. The suggestion service 310 notifies the file server 320 of the user, and obtains a history of files that are stored in the file server 320 and printed by the user in the past. The suggestion service 310 records the obtained print history into the RAM 213. The processing then proceeds to step S1703. The print history obtained from the file server 320 can be the entire history retained in the file server 320. The suggestion service 310 can obtain a history by specifying the number of history records or specifying a period.

In step S1703, the suggestion service 310 determines whether there is an unselected print history record in the print history. In a case where there is an unselected print history record (YES in step S1703), the processing proceeds to step S1704. In a case where there is no unselected print history record (NO in step S1703), the processing proceeds to step S1709.

In step S1704, the suggestion service 310 selects an unselected print history record closest to the current time from the print history in the RAM 213. The processing proceeds to step S1705.

In step S1705, the suggestion service 310 searches the print candidate file list for files similar to the printed file described in the selected print history record, and generates a list of similar files. To search for similar files, the suggestion service 310 initially identifies a character string in a date format and a character string expressing a version in the filename of the printed file described in the print history record, and determines the filename excluding the identified parts as a unique name. The suggestion service 310 then obtains a file having the same unique name with different character strings in the parts of the specific formats from the print candidate file list. In a case where a plurality of such files is found, all such files are recorded in the list of similar files (similar file list). The suggestion service 310 records the similar file list into the RAM 213. The processing then proceeds to step S1706.

In step S1706, the suggestion service 310 determines a highest priority similar file from the similar file list recorded in the RAM 213. In comparing the similar files, the suggestion service 310 compares the character strings in the date format and those expressing versions. A file having the latest date or version is determined to be the highest priority similar file. The suggestion service 310 stores information about the highest priority similar file into the RAM 213. The processing then proceeds to step S1707. Examples of the similar files and the highest priority similar file will now be described. A file in the print history record having a filename XXXX_20200305.pptx is taken as an example. In such a case, the suggestion service 310 determines that the latter part 20220305 is a character string indicating a date, and XXXX and.pptx are fixed parts. Files having filenames, for example, XXXX_20200312.pptx and XXXX_20201005.pptx are also found as similar files. In such a case, the suggestion service 310 compares the date parts of the similar files, and determines that the file having the filename XXXX_20201005.pptx is the highest priority similar file since this file is dated later.

In step S1707, the suggestion service 310 determines the degree of priority of the highest priority similar file recorded in the RAM 213, based on the print history and the file attribute information in the print candidate file list. The degree of priority determined in this processing is recorded into the RAM 213 as the estimation result list along with the file ID. The processing then proceeds to step S1708.

In step S1708, the suggestion service 310 determines the reason for priority based on which the degree of priority is determined in step S1707. In this processing, the reason for priority used in the determination of the degree of priority is determined based on the fact that the file is determined as the highest priority similar file among the files having similar filenames to that of the printed file in the print history record. For example, in a case where the selected file has a filename XXXX_20201005.pptx, information "similar file to XXXX_20200312.pptx in print history" is determined as the reason for priority. The suggestion service 310 records the reason for priority determined in this processing into the item of the reason for priority on the estimation result list. The processing then returns to step S1703.

In step S1709, the suggestion service 310 sorts the estimation result list stored in the RAM 213 by the degree of priority settings. The processing proceeds to step S1710. A candidate having no degree of priority setting is determined to have a degree of priority lower than those of candidates having degree of priority settings.

In step S1710, the suggestion service 310 stores the estimation result list sorted in step S1710 in the HDD 214. The processing then ends.

Figure 17B:
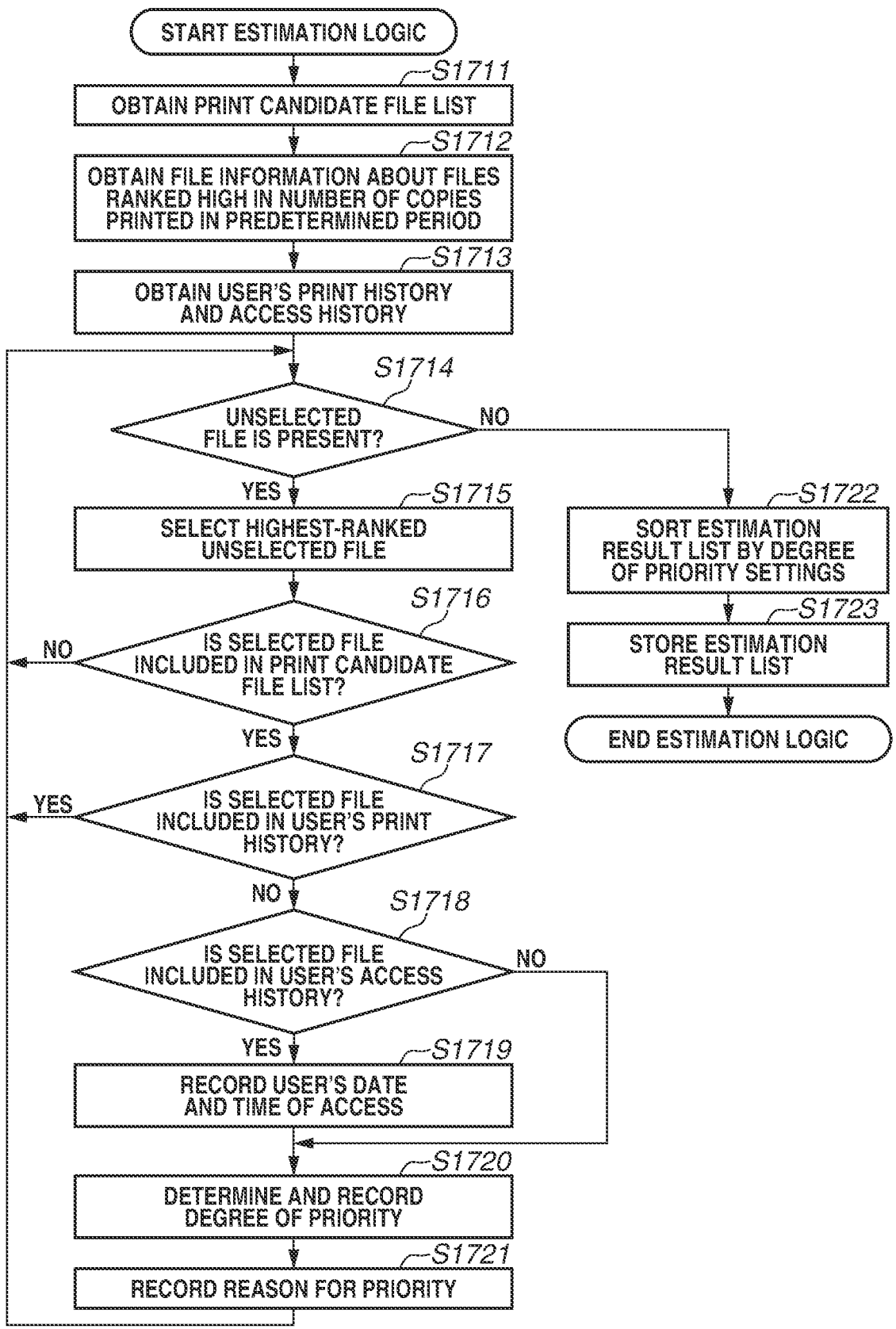

FIG. 17B is a flowchart illustrating processing for executing the estimation logic based on the usage by other users, which is a type of estimation logic execution processing in step S1504 of FIG. 15. This processing is performed by the suggestion service 310 running on the control program that has been read from the ROM 212 and loaded into the RAM 213 by the CPU 211 of the application server 102.

In step S1711, the suggestion service 310 reads the print candidate file list from the HDD 214, and records the print candidate file list into the RAM 213. The processing then proceeds to step S1712.

In step S1712, the suggestion service 310 obtains file information about files ranked high in the number of copies printed in a predetermined period from the file server 320. The suggestion service 310 identifies files printed by many users from the print history recorded on the file server 320, and obtains the files. The suggestion service 310 records a list of the obtained files ranked high in the number of copies printed (hereinafter, referred to as a print number top file list) into the RAM 213. The processing then proceeds to step S1713. The predetermined period can be freely specified by the user. The suggestion service 310 can determine the period in advance. In the determination of whether the files are ranked high in terms of the number of copies printed, the suggestion service 310 can specify the number of copies printed and determine all files that reach or exceed the number of copies printed in the print history as the files ranked high. A predetermined number of files ranked high in the number of copies printed can be obtained from the top.

In step S1713, the suggestion service 310 obtains the print history of the concerned user from the file server 320. The suggestion service 310 notifies the file server 320 of the user, and obtains the history of files that are stored in the file server 320 and printed by the user in the past and a history of files accessed by the user (access history). The suggestion service 310 records both the obtained print and access histories into the RAM 213. The processing then proceeds to step S1714. The print history and the access history obtained from the file server 320 can be the entire histories retained in the file server 320. The histories can be obtained by specifying the number of history records or specifying a period.

In step S1714, the suggestion service 310 determines whether there is an unselected file on the print number top file list. In a case where there is an unselected file (YES in step S1714), the processing proceeds to step S1715. In a case where there is no unselected file (NO in step S1714), the processing proceeds to step S1722.

In step S1715, the suggestion service 310 selects the highest-ranked unselected file from among unselected files on the print number top file list in the RAM 213. The processing then proceeds to step S1716.

In step S1716, the suggestion service 310 determines whether the file selected in step S1715 is included in the print candidate file list. In a case where the file is included in the print candidate file list (YES in step S1716), the processing proceeds to step S1717. In a case where the file is not included in the print candidate file list (NO in step S1716), the processing returns to step S1714.

In step S1717, the suggestion service 310 determines whether the file selected in step S1715 is included in the user's print history. In a case where the file is included in the print history (YES in step S1717), the suggestion service 310 determines that the file has already been printed, and the processing returns to step S1714. In a case where the file is not included in the print history (NO in step S1717), the processing proceeds to step S1718.

In step S1718, the suggestion service 310 determines whether the file selected in step S1715 is included in the user's access history. In a case where the file is included in the access history (YES in step S1718), the suggestion service 310 determines that the user is interested in the file, and the processing proceeds to step S1719. In a case where the file is not included in the access history (NO in step S1718), the processing proceeds to step S1720.

In step S1719, the suggestion service 310 adds information about the date and time of the access made by the user to the information about the file selected in step S1715, and records the file into the RAM 213. The processing then proceeds to step S1720.

In step S1720, the suggestion service 310 determines the degree of priority of the file recorded in the RAM 213 using the number of copies printed and the date and time of access. The degree of priority determined in this processing is recorded into the RAM 213 as the estimation result list along with the file ID. The processing then proceeds to step S1721.

In step S1721, the suggestion service 310 determines the reason for priority based on which the degree of priority is determined in step S1720. The number of copies printed and/or the date and time of access based on which the file is determined to have priority is/are determined as the reason for priority for the degree of priority. For example, in the case of a file included in the access history, information, such as "printed by X users, accessed on 2021/10/05", is determined as the reason for priority. In the case of a file not included in the access history, information such as "printed by X users" is determined as the reason for priority. The suggestion service 310 records the reason for priority determined in this processing into the item of the reason for priority on the estimation result list. The processing then returns to step S1714.

In step S1722, the suggestion service 310 sorts the estimation result list stored in the RAM 213 by the degree of priority settings. The processing then proceeds to step S1723. A candidate having no degree of priority setting is determined to have a degree of priority lower than those of candidates having degree of priority settings.

In step S1723, the suggestion service 310 stores the estimation result list sorted in step S1722 in the HDD 214. The processing then ends.

Figure 17C:
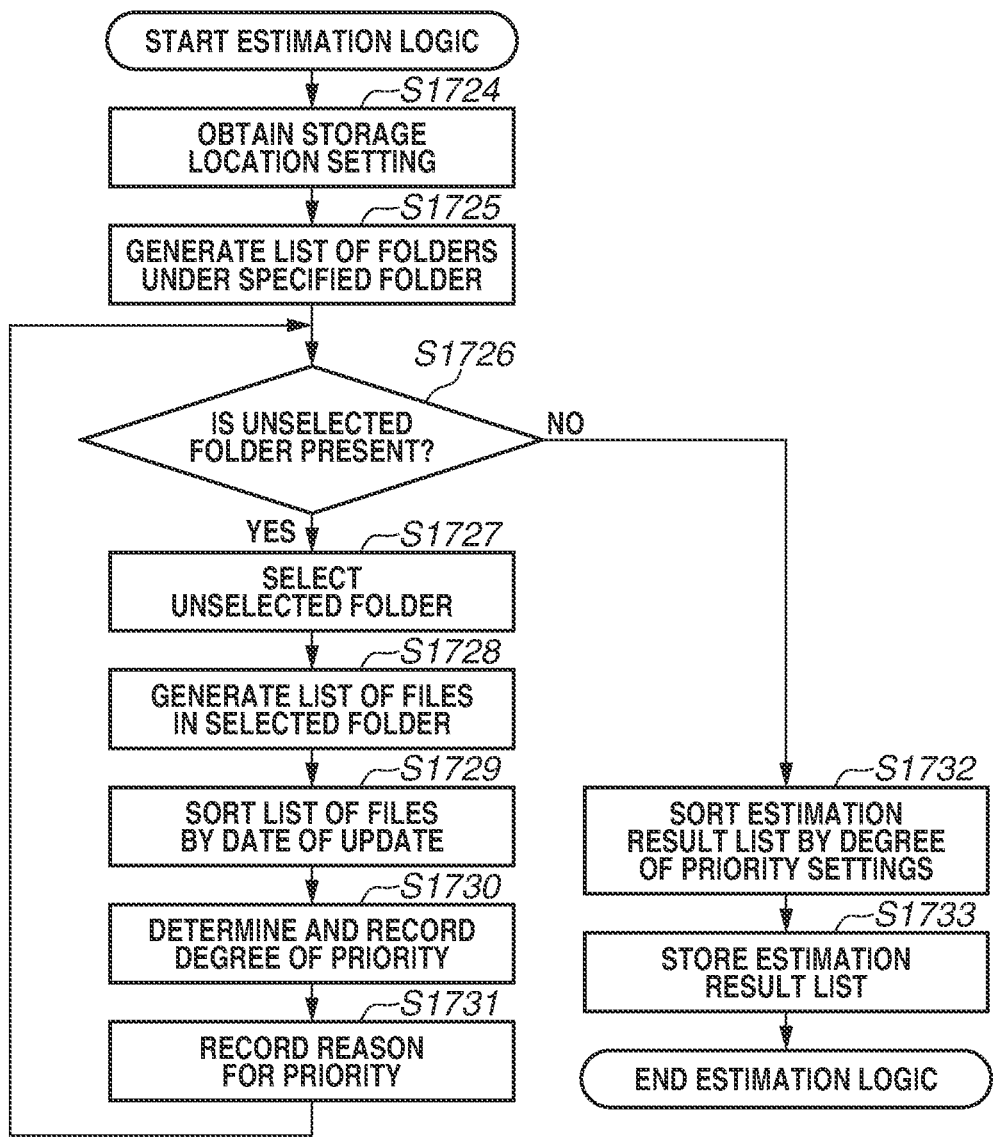

FIG. 17C is a flowchart illustrating processing for executing the estimation logic based on a predetermined storage location, which is a type of estimation logic execution processing performed in step S1504 of FIG. 15. This processing is performed by the suggestion service 310 running on the control program that has been read from the ROM 212 and loaded into the RAM 213 by the CPU 211 of the application server 102.

In step S1724, the suggestion service 310 obtains a predetermined storage location setting from the settings of the estimation logic based on a predetermined storage location, set in the print candidate estimation setting. The suggestion service 310 records the obtained information about the predetermined storage location into the RAM 213. The processing then proceeds to step S1725. A plurality of folder locations on the file server 320 can be registered as the predetermined storage location setting. The suggestion service 310 reads information about all the registered storage locations and records the information into the RAM 213.

In step S1725, the suggestion service 310 generates a list of folders below the folder specified as the predetermined storage location. In a case where more than one storage location is registered as the predetermined storage location, the list of folders (folder list) is generated by performing the same processing on each of the storage locations. The list of folders can be generated from all the applicable folders. To reduce the number of folders, the list of folders can be generated only from folders of which the dates and times of creation are after the date and time of the previous execution of the estimation logic, or only from folders created before a predetermined period. In a case where a folder below the specified folder includes only folders, the folders at the even lower levels can be checked without recording the folder in the folder list. In a case where a folder does not include any file or folder, the folder can be excluded from the folder list. The suggestion service 310 stores the generated list of folders into the RAM 213. The processing then proceeds to step S1726.

In step S1726, the suggestion service 310 determines whether there is an unselected folder in the folder list. In a case where there is an unselected folder (YES in step S1726), the processing proceeds to step S1727. In a case where there is no unselected folder (NO in step S1726), the processing proceeds to step S1732.

In step S1727, the suggestion service 310 selects an unselected folder on the folder list in the RAM 213. The processing then proceeds to step S1728.

In step S1728, the suggestion service 310 generates a list of files in the selected folder. The list generated in this processing only includes files to be printed, and folders and files not to be printed are excluded from the list. The suggestion service 310 records the generated list of files into the RAM 213. The processing then proceeds to step S1729.

In step S1729, the suggestion service 310 sorts the list of files recorded in the RAM 213 in descending order of the date of update, and deletes files having the dates of update older than the date of creation of the folder from the list of files. The suggestion service 310 stores information about the file having the date of update of the latest among the remaining files into the RAM 213. The processing then proceeds to step S1730.

In step S1730, the suggestion service 310 determines the degree of priority of the file, information of which has been recorded in the RAM 213, using the predetermined storage location, the information about the folder list, and the file attribute information. The suggestion service 310 stores the determined degree of priority into the RAM 213 as the estimation result list along with the file ID. The processing then proceeds to step S1731.

In step S1731, the suggestion service 310 determines the reason for priority based on which the degree of priority is determined in step S1730. In this processing, the reason for priority used in the determination of the degree of priority is based on the fact that the file is determined to be given priority based on the predetermined storage location, the information about the folder list, and the file information. For example, information, such as "updated file in or below folder YYYY", is determined as the reason for priority. The suggestion service 310 records the determined reason for priority into the item of the reason for priority on the estimation result list. The processing then returns to step S1726.

In step S1732, the suggestion service 310 sorts the estimation result list stored in the RAM 213 by the degree of priority settings. The processing then proceeds to step S1733. A candidate having no degree of priority setting is determined to have a lower degree of priority than those of candidates having degree of priority settings.

In step S1733, the suggestion service 310 stores the estimation result list sorted in step S1732 in the HDD 214. The processing then ends.

Figure 17D:
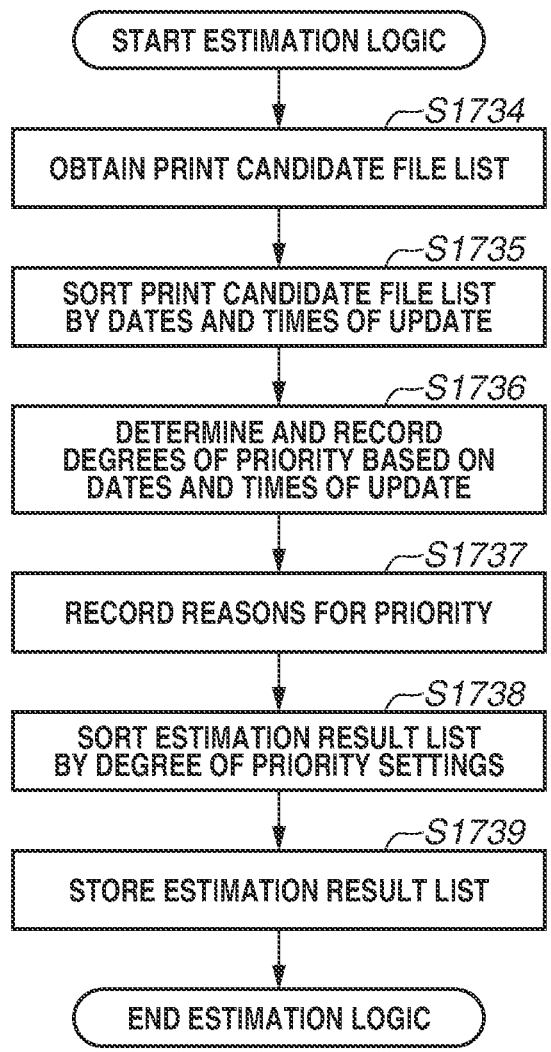

FIG. 17D is a flowchart illustrating processing for executing the estimation logic based on the date and time of update, which is a type of estimation logic execution processing performed in step S1504 of FIG. 15. This processing is performed by the suggestion service 310 running on the control program that has been read from the ROM 212 and loaded into the RAM 213 by the CPU 211 of the application server 102.

In step S1734, the suggestion service 310 reads the print candidate file list from the HDD 214, and records the print candidate file list into the RAM 213. The processing then proceeds to step S1735.

In step S1735, the suggestion service 310 sorts the read print candidate file list in order of the date and time of update, and records the sorted print candidate file list into the RAM 213. The processing then proceeds to step S1736.

In step S1736, the suggestion service 310 determines the degrees of priority of the files in descending order of the dates and times of update on the print candidate file list stored in step S1735. The suggestion service 310 records the determined degrees of priority into the RAM 213 as the estimation result list along with the file IDs. The processing then proceeds to step S1737. In the present exemplary embodiment, the suggestion service 310 assigns degrees of priority in descending order of the dates and times of update, like 10 to the file having the latest date and time of update on the print candidate file list and 9 to the file having the second latest. The suggestion service 310 assigns the degrees of priority to the top ten files, and a degree of priority of 0 to the rest. Alternatively, the suggestion service 310 can assign degrees of priority to files in order from the latest date and time of update, and a degree of priority of 1 to the rest. The suggestion service 310 can specify a period from the current date and set the degrees of priority to files updated within the period.

In step S1737, the suggestion service 310 determines the reasons for priority based on which the degrees of priority are determined in step S1736. The reasons for priority used in the determination of the degrees of priority are the dates and times of update. For example, in a case where the date and time of update of a file is Oct. 10, 2021, 14:30, information, such as "2021/10/10 14:30 updated", is determined as the reason for priority. The suggestion service 310 records the reasons for priority determined in this processing into the item of the reason for priority on the estimation result list. The processing then proceeds to step S1738.

In step S1738, the suggestion service 310 sorts the estimation result list stored in the RAM 213 by the degree of priority settings. The processing then proceeds to step S1739. A candidate having no degree of priority setting is determined to have a lower degree of priority than those of candidates having degree of priority settings.

In step S1739, the suggestion service 310 stores the estimation result list sorted in step S1738 in the HDD 214. The processing then ends.

Figure 18:
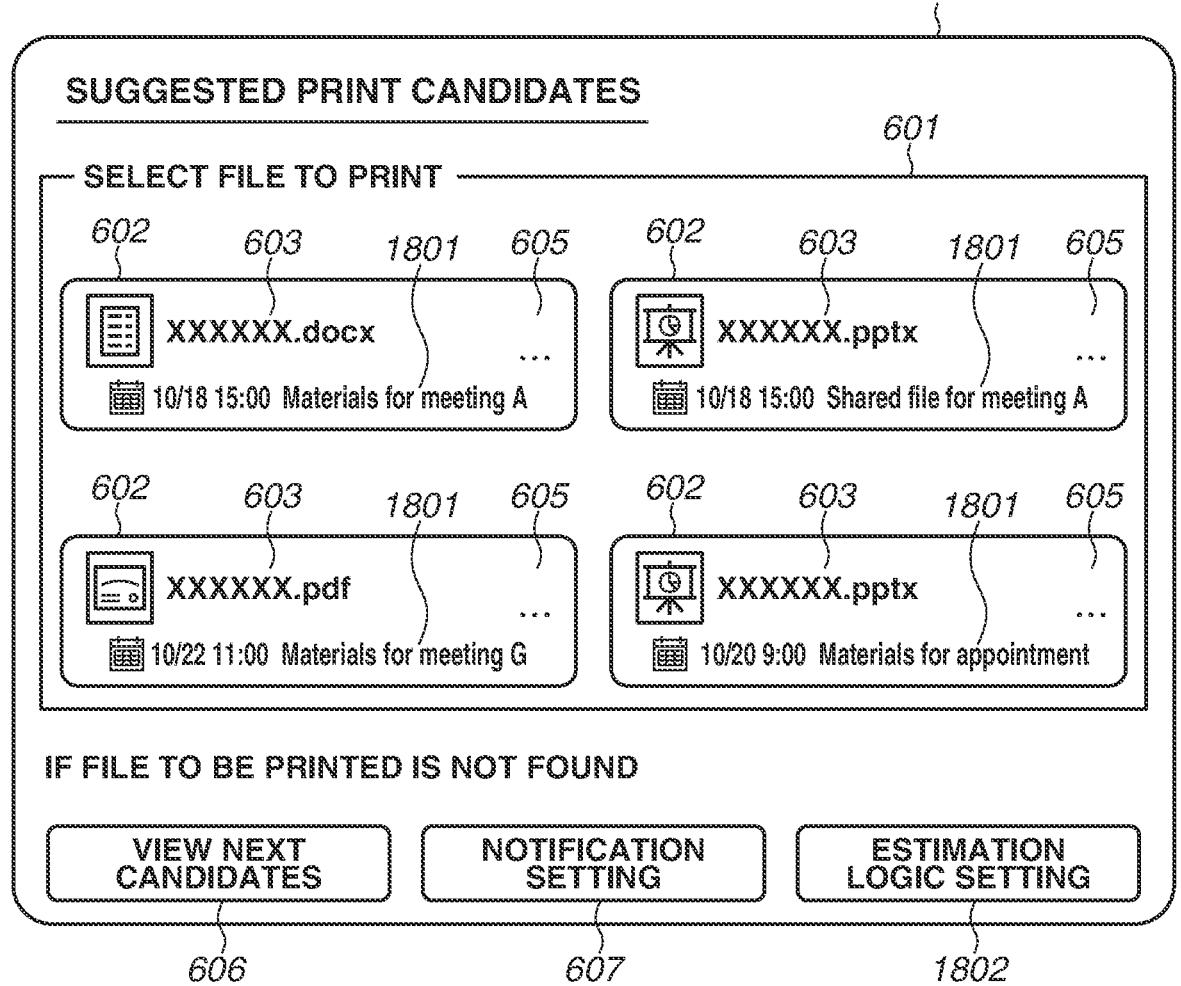
FIG. 18 is a diagram illustrating an example of a print suggestion screen.

FIG. 18 illustrates an example of the print suggestion screen that is displayed to the user by the notification application 300 according to the present exemplary embodiment. The print suggestion screen is displayed on the display 208 of the PC 101. Alternatively, the print suggestion screen can be displayed as a pop-up screen on the PC 101 or a notification issued by a chat application or a collaboration tool running on the PC 101. Elements having similar configurations to those of FIG. 6 according to the first exemplary embodiment are denoted by the same reference numerals, and the redundant descriptions will be omitted. A print suggestion screen 1800 includes a print suggestion file display area 601, a plurality of pieces of print suggestion file information 602 in the print suggestion file display area 601, a view next candidates button 606, a notification setting button 607, and an estimation logic setting button 1802. The print suggestion file display area 601 includes the print suggestion file information 602 configured similarly to that in FIG. 6. Reasons for priority 1801 in the print suggestion file information 602 describe the reasons for priority derived by the estimation logic determined as the highest priority logic in the print candidate estimation processing. The estimation logic setting button 1802 is a button for instructing the notification application 300 to perform the print candidate estimation settings. In a case where the estimation logic setting button 1802 is selected, the print suggestion screen 1800 transitions to the setting screen 1600.

The foregoing system operation according to the second exemplary embodiment enables the user to be notified of a print candidate list at a timing determined by the printing system based on use histories and file characteristics other than schedule information and to determine whether to perform printing based on the notification content. This can reduce the user's time and labor in searching for materials to be printed. The above-described exemplary embodiments can be practiced in combination or independently of each other.

OTHER EMBODIMENTS

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, these embodiments are not seen to be limiting. The scope of the following claims is to be accorded the broadest interpretation so as to encompass all such modifications and equivalent structures and functions.

This application claims the benefit of Japanese Patent Application No. 2022-027678, filed Feb. 25, 2022, which is hereby incorporated by reference herein in its entirety.

What is claimed is:

1. A printing system comprising:
a printing apparatus; and
a server,
wherein the printing apparatus is configured to print, based on print data, an image on a sheet,
wherein the server is configured to identify print data candidates,
wherein the server is configured to notify, at a timing based on a time of a schedule set on a schedule management function, a user of the identified print data candidates, and
wherein the printing apparatus prints, based on print data selected by the user from among the notified print data candidates, an image on a sheet.

2. The printing system according to claim 1, the printing system further comprising:
an information processing apparatus;
wherein the information processing apparatus is notified of the identified print data candidates, and
wherein the printing apparatus prints, based on the print data selected from among the notified print data candidates via an operation unit of the information processing apparatus, the image on the sheet.

3. The printing system according to claim 2,
wherein an application installed on the information processing apparatus is notified of the identified print data candidates, and
wherein the information processing apparatus is configured to accept selection of the print data using a selection screen displayed by the application.

4. The printing system according to claim 3, wherein the application installed on the information processing apparatus is a chat application.

5. The printing system according to claim 4, wherein the print data candidates are notified such that the print data candidates are posted in a talk room displayed by the chat application.

6. The printing system according to claim 1, wherein the print data candidates are identified from data set, on the schedule management function, in association with the schedule.

7. The printing system according to claim 6, wherein the print data candidates are identified from data set, on the schedule management function, in association with the user and the time.

8. The printing system according to claim 1, wherein the identified print data candidates are notified at the timing based on a start time of the schedule.

9. The printing system according to claim 1,
wherein the server is further configured to set a number of identified print data candidates to be notified, and
wherein the identified print data candidates are notified based on the set number.

10. The printing system according to claim 1, the server further configured to determine degrees of priority from among the identified print data candidates,
wherein the print data candidates are displayed in order based on the determined degrees of priority.

11. A printing method comprising:
printing, based on print data, an image on a sheet;
identifying print data candidates; and
notifying, at a timing based on a time of a schedule set on a schedule management function, a user of the identified print data candidates,
wherein the image is printed on the sheet based on print data selected by the user from among the notified print data candidates.

12. A non-transitory computer-readable storage medium storing a program for causing a computer to perform a method, the method comprising:
printing, based on print data, an image on a sheet;
identifying print data candidates; and
notifying, at a timing based on a time of a schedule set on a schedule management function, a user of the identified print data candidates,
wherein the image is printed on the sheet based on print data selected by the user from among the notified print data candidates.

* * * * *